United States Patent
Prudkovskiy et al.

(10) Patent No.: US 12,088,606 B2
(45) Date of Patent: Sep. 10, 2024

(54) SYSTEM AND METHOD FOR DETECTION OF MALICIOUS NETWORK RESOURCES

(71) Applicant: F.A.C.C.T. NETWORK SECURITY LLC, Moscow (RU)

(72) Inventors: Nikolay Prudkovskiy, Moscow (RU); Dmitry Volkov, Moscow (RU)

(73) Assignee: F.A.C.C.T. NETWORK SECURITY LLC, Moscow (RU)

( * ) Notice: Subject to any disclaimer, the term of this patent is extended or adjusted under 35 U.S.C. 154(b) by 265 days.

(21) Appl. No.: 17/828,396

(22) Filed: May 31, 2022

(65) Prior Publication Data

US 2022/0407875 A1    Dec. 22, 2022

(30) Foreign Application Priority Data

Jun. 10, 2021  (RU) ............................ RU2021116850

(51) Int. Cl.
*H04L 9/40*    (2022.01)
*H04L 61/4541*  (2022.01)

(52) U.S. Cl.
CPC ...... *H04L 63/1416* (2013.01); *H04L 61/4541* (2022.05)

(58) Field of Classification Search
CPC ............ H04L 63/1416; H04L 61/4541; H04L 63/0236; H04L 61/2514
See application file for complete search history.

(56) References Cited

U.S. PATENT DOCUMENTS

| | | |
|---|---|---|
| 7,225,343 B1 | 5/2007 | Honig et al. |
| 7,496,628 B2 | 2/2009 | Arnold et al. |
| 7,512,980 B2 | 3/2009 | Copeland et al. |

(Continued)

FOREIGN PATENT DOCUMENTS

| | | |
|---|---|---|
| CN | 103491205 A | 1/2014 |
| CN | 104504307 A | 4/2015 |

(Continued)

OTHER PUBLICATIONS

Notice of Allowance with regard to U.S. Appl. No. 17/712,243 mailed Mar. 20, 2024.

(Continued)

*Primary Examiner* — Bryan Y Lee
(74) *Attorney, Agent, or Firm* — BCF LLP

(57) ABSTRACT

A method and system for detection of malicious network resources in a distributed computer system are provided. The method comprises: receiving, by a first computing device, disposed inside the distributed computer system, an outbound traffic, detecting, by the first computing device, a suspicious external IP address in the outbound traffic, scanning, by the first computing device, a suspicious device located at the suspicious IP address to obtain a list of services running thereon, transmitting, by the first computing device, the suspicious IP address and the list of services to a second computing device disposed outside the distributed computer system, comparing, by the second computing device, the list of services with known malicious services, and in response to a match between at least one service from the list of services and a respective one of the known malicious services: determining the suspicious device, at the suspicious IP address, as being malicious.

8 Claims, 8 Drawing Sheets

(56) References Cited

U.S. PATENT DOCUMENTS

| | | |
|---|---|---|
| 7,712,136 B2 | 5/2010 | Sprosts et al. |
| 7,730,040 B2 | 6/2010 | Reasor et al. |
| 7,865,953 B1 | 1/2011 | Hsieh et al. |
| 7,926,113 B1 | 4/2011 | Gula et al. |
| 7,930,256 B2 | 4/2011 | Gonsalves et al. |
| 7,958,555 B1 | 6/2011 | Chen et al. |
| 7,984,500 B1 | 7/2011 | Khanna et al. |
| 8,132,250 B2 | 3/2012 | Judge et al. |
| 8,151,341 B1 | 4/2012 | Gudov |
| 8,176,178 B2 | 5/2012 | Thomas et al. |
| 8,255,532 B2 | 8/2012 | Smith-Mickelson et al. |
| 8,260,914 B1 | 9/2012 | Ranjan |
| 8,285,830 B1 | 10/2012 | Stout et al. |
| 8,402,543 B1 | 3/2013 | Ranjan et al. |
| 8,448,245 B2 | 5/2013 | Banerjee et al. |
| 8,532,382 B1 | 9/2013 | Ioffe |
| 8,533,819 B2 | 9/2013 | Hoeflin et al. |
| 8,539,582 B1 | 9/2013 | Aziz et al. |
| 8,555,388 B1 | 10/2013 | Wang et al. |
| 8,561,177 B1 | 10/2013 | Aziz et al. |
| 8,578,491 B2 | 11/2013 | Mcnamee et al. |
| 8,600,993 B1 | 12/2013 | Gupta et al. |
| 8,612,463 B2 | 12/2013 | Brdiczka et al. |
| 8,625,033 B1 | 1/2014 | Marwood et al. |
| 8,635,696 B1 | 1/2014 | Aziz |
| 8,635,700 B2 | 1/2014 | Richard et al. |
| 8,650,080 B2 | 2/2014 | O'Connell et al. |
| 8,660,296 B1 | 2/2014 | Ioffe |
| 8,677,472 B1 | 3/2014 | Dotan et al. |
| 8,776,229 B1 | 7/2014 | Aziz |
| 8,839,441 B2 | 9/2014 | Saxena et al. |
| 8,850,571 B2 | 9/2014 | Staniford et al. |
| 8,856,937 B1 | 10/2014 | Wüest et al. |
| 8,972,412 B1 | 3/2015 | Christian et al. |
| 8,984,640 B1 | 3/2015 | Emigh et al. |
| 9,026,840 B1 | 5/2015 | Kim |
| 9,043,920 B2 | 5/2015 | Gula et al. |
| 9,060,018 B1 | 6/2015 | Yu et al. |
| 9,130,980 B2 | 9/2015 | Law et al. |
| 9,210,111 B2 | 12/2015 | Chasin et al. |
| 9,215,239 B1 | 12/2015 | Wang et al. |
| 9,253,208 B1 | 2/2016 | Koshelev |
| 9,292,691 B1 | 3/2016 | Hittel |
| 9,330,258 B1 | 5/2016 | Satish et al. |
| 9,338,181 B1 | 5/2016 | Burns et al. |
| 9,357,469 B2 | 5/2016 | Smith et al. |
| 9,456,000 B1 | 9/2016 | Spiro et al. |
| 9,654,593 B2 | 5/2017 | Garg et al. |
| 9,723,344 B1 | 8/2017 | Granström et al. |
| 9,736,178 B1 | 8/2017 | Ashley |
| 9,838,407 B1 | 12/2017 | Oprea et al. |
| 9,917,852 B1 | 3/2018 | Xu et al. |
| 9,934,376 B1 | 4/2018 | Ismael |
| 10,110,601 B1 | 10/2018 | Jakobsson et al. |
| 10,212,175 B2 | 2/2019 | Seul et al. |
| 10,284,595 B2 | 5/2019 | Reddy et al. |
| 10,326,777 B2 | 6/2019 | Demopoulos et al. |
| 10,440,050 B1 | 10/2019 | Neel et al. |
| 10,462,169 B2 | 10/2019 | Joseph et al. |
| 10,630,674 B2 | 4/2020 | Bell et al. |
| 10,721,262 B2 | 7/2020 | Zorlular et al. |
| 10,742,676 B2 | 8/2020 | Mahaffey et al. |
| 10,778,701 B2 | 9/2020 | Perilli |
| 10,848,515 B1 | 11/2020 | Pokhrel et al. |
| 10,855,700 B1 | 12/2020 | Jeyaraman et al. |
| 10,862,907 B1 | 12/2020 | Pon et al. |
| 10,873,597 B1 | 12/2020 | Mehra et al. |
| 11,265,292 B1 | 3/2022 | Leviseur |
| 11,425,148 B2 | 8/2022 | Zawoad et al. |
| 2002/0161862 A1 | 10/2002 | Horvitz |
| 2003/0009696 A1 | 1/2003 | Bunker et al. |
| 2003/0028803 A1 | 2/2003 | Bunker et al. |
| 2004/0193918 A1 | 9/2004 | Green et al. |
| 2006/0074858 A1 | 4/2006 | Etzold et al. |
| 2006/0107321 A1 | 5/2006 | Tzadikario |
| 2006/0224898 A1 | 10/2006 | Ahmed |
| 2006/0253582 A1 | 11/2006 | Dixon et al. |
| 2007/0019543 A1 | 1/2007 | Wei et al. |
| 2007/0239999 A1 | 10/2007 | Honig et al. |
| 2008/0080518 A1* | 4/2008 | Hoeflin ............. H04L 63/1425 370/395.42 |
| 2008/0295173 A1 | 11/2008 | Tsvetanov |
| 2009/0077383 A1 | 3/2009 | De Monseignat et al. |
| 2009/0138342 A1 | 5/2009 | Otto et al. |
| 2009/0281852 A1 | 11/2009 | Abhari et al. |
| 2009/0292925 A1 | 11/2009 | Meisel |
| 2010/0011124 A1 | 1/2010 | Wei et al. |
| 2010/0037314 A1 | 2/2010 | Perdisci et al. |
| 2010/0076857 A1 | 3/2010 | Deo et al. |
| 2010/0115620 A1 | 5/2010 | Alme |
| 2010/0115621 A1 | 5/2010 | Staniford |
| 2010/0154059 A1 | 6/2010 | Mcnamee et al. |
| 2010/0191737 A1 | 7/2010 | Friedman et al. |
| 2010/0205665 A1 | 8/2010 | Komili et al. |
| 2010/0228731 A1 | 9/2010 | Gollapudi |
| 2010/0235918 A1 | 9/2010 | Mizrahi et al. |
| 2010/0313264 A1* | 12/2010 | Xie ..................... H04L 63/101 726/22 |
| 2011/0016533 A1 | 1/2011 | Zeigler et al. |
| 2011/0083180 A1 | 4/2011 | Mashevsky et al. |
| 2011/0222787 A1 | 9/2011 | Thiemert et al. |
| 2012/0011589 A1* | 1/2012 | Chen ................. H04L 61/2514 726/22 |
| 2012/0030293 A1 | 2/2012 | Bobotek |
| 2012/0079596 A1 | 3/2012 | Thomas et al. |
| 2012/0087583 A1 | 4/2012 | Yang et al. |
| 2012/0158626 A1 | 6/2012 | Zhu et al. |
| 2012/0233656 A1 | 9/2012 | Rieschick et al. |
| 2012/0291125 A1 | 11/2012 | Maria |
| 2013/0086677 A1 | 4/2013 | Ma et al. |
| 2013/0103666 A1 | 4/2013 | Sandberg et al. |
| 2013/0111591 A1 | 5/2013 | Topan et al. |
| 2013/0117848 A1 | 5/2013 | Golshan et al. |
| 2013/0145471 A1 | 6/2013 | Richard et al. |
| 2013/0191364 A1 | 7/2013 | Kamel et al. |
| 2013/0263264 A1 | 10/2013 | Klein et al. |
| 2013/0297619 A1 | 11/2013 | Chandrasekaran et al. |
| 2013/0312097 A1 | 11/2013 | Turnbull |
| 2013/0340080 A1 | 12/2013 | Gostev et al. |
| 2014/0033307 A1 | 1/2014 | Schmidtler |
| 2014/0058854 A1 | 2/2014 | Ranganath et al. |
| 2014/0082730 A1 | 3/2014 | Vashist et al. |
| 2014/0173287 A1 | 6/2014 | Mizunuma |
| 2014/0250145 A1 | 9/2014 | Jones et al. |
| 2014/0310811 A1 | 10/2014 | Hentunen |
| 2014/0317754 A1 | 10/2014 | Niemela et al. |
| 2014/0380480 A1 | 12/2014 | Tang |
| 2015/0007250 A1 | 1/2015 | Dicato, Jr. et al. |
| 2015/0049547 A1 | 2/2015 | Kim |
| 2015/0067839 A1 | 3/2015 | Wardman et al. |
| 2015/0163242 A1 | 6/2015 | Laidlaw et al. |
| 2015/0170312 A1 | 6/2015 | Mehta et al. |
| 2015/0200962 A1 | 7/2015 | Xu et al. |
| 2015/0200963 A1 | 7/2015 | Geng et al. |
| 2015/0220735 A1 | 8/2015 | Paithane et al. |
| 2015/0295945 A1 | 10/2015 | Canzanese et al. |
| 2015/0363791 A1 | 12/2015 | Raz et al. |
| 2015/0381654 A1 | 12/2015 | Wang et al. |
| 2016/0036837 A1 | 2/2016 | Jain et al. |
| 2016/0036838 A1 | 2/2016 | Jain et al. |
| 2016/0044054 A1 | 2/2016 | Stiansen et al. |
| 2016/0055490 A1 | 2/2016 | Keren et al. |
| 2016/0065595 A1 | 3/2016 | Kim et al. |
| 2016/0080410 A1 | 3/2016 | Gorny et al. |
| 2016/0112445 A1 | 4/2016 | Abramowitz |
| 2016/0127907 A1 | 5/2016 | Baxley et al. |
| 2016/0142429 A1 | 5/2016 | Renteria |
| 2016/0149943 A1 | 5/2016 | Kaloroumakis et al. |
| 2016/0191243 A1 | 6/2016 | Manning |
| 2016/0205122 A1 | 7/2016 | Bassett |
| 2016/0205123 A1 | 7/2016 | Almurayh et al. |
| 2016/0226894 A1 | 8/2016 | Lee et al. |
| 2016/0253679 A1 | 9/2016 | Venkatraman et al. |
| 2016/0261628 A1 | 9/2016 | Doron et al. |

(56) References Cited

U.S. PATENT DOCUMENTS

| | | |
|---|---|---|
| 2016/0267179 A1 | 9/2016 | Mei et al. |
| 2016/0285907 A1 | 9/2016 | Nguyen et al. |
| 2016/0306974 A1 | 10/2016 | Turgeman et al. |
| 2016/0308898 A1 | 10/2016 | Teeple et al. |
| 2016/0359679 A1 | 12/2016 | Parandehgheibi et al. |
| 2016/0366099 A1 | 12/2016 | Jordan |
| 2017/0034211 A1 | 2/2017 | Buergi et al. |
| 2017/0078321 A1 | 3/2017 | Maylor et al. |
| 2017/0111377 A1 | 4/2017 | Park et al. |
| 2017/0134401 A1 | 5/2017 | Medvedovsky et al. |
| 2017/0142144 A1 | 5/2017 | Weinberger et al. |
| 2017/0149813 A1 | 5/2017 | Wright et al. |
| 2017/0200457 A1 | 7/2017 | Chai et al. |
| 2017/0230401 A1 | 8/2017 | Ahmed et al. |
| 2017/0244735 A1 | 8/2017 | Visbal et al. |
| 2017/0250972 A1 | 8/2017 | Ronda et al. |
| 2017/0264627 A1 | 9/2017 | Hunt et al. |
| 2017/0272471 A1 | 9/2017 | Veeramachaneni et al. |
| 2017/0279818 A1 | 9/2017 | Milazzo et al. |
| 2017/0286544 A1 | 10/2017 | Hunt et al. |
| 2017/0289187 A1 | 10/2017 | Noel et al. |
| 2017/0295157 A1 | 10/2017 | Chavez et al. |
| 2017/0295187 A1 | 10/2017 | Havelka et al. |
| 2017/0324738 A1 | 11/2017 | Hari et al. |
| 2017/0346839 A1 | 11/2017 | Peppe et al. |
| 2017/0359368 A1 | 12/2017 | Hodgman et al. |
| 2018/0012021 A1 | 1/2018 | Volkov |
| 2018/0012144 A1 | 1/2018 | Ding et al. |
| 2018/0034779 A1 | 2/2018 | Ahuja et al. |
| 2018/0063190 A1 | 3/2018 | Wright et al. |
| 2018/0069883 A1 | 3/2018 | Meshi et al. |
| 2018/0096153 A1 | 4/2018 | Dewitte et al. |
| 2018/0115573 A1 | 4/2018 | Kuo et al. |
| 2018/0144138 A1 | 5/2018 | Zhang |
| 2018/0152471 A1 | 5/2018 | Jakobsson |
| 2018/0255076 A1 | 9/2018 | Paine |
| 2018/0268464 A1 | 9/2018 | Li |
| 2018/0307832 A1 | 10/2018 | Ijiro et al. |
| 2018/0309787 A1 | 10/2018 | Evron et al. |
| 2019/0089737 A1 | 3/2019 | Shayevitz et al. |
| 2019/0132348 A1 | 5/2019 | Ng et al. |
| 2019/0207973 A1 | 7/2019 | Peng |
| 2019/0373005 A1 | 12/2019 | Bassett |
| 2020/0134702 A1 | 4/2020 | Li |
| 2021/0021644 A1 | 1/2021 | Crabtree et al. |
| 2021/0311718 A1 | 10/2021 | Sinha et al. |
| 2022/0060507 A1 | 2/2022 | Crabtree et al. |
| 2022/0131835 A1* | 4/2022 | Fenton ............... H04L 63/0236 |
| 2022/0407875 A1 | 12/2022 | Prudkovskiy et al. |

FOREIGN PATENT DOCUMENTS

| | | |
|---|---|---|
| CN | 105429955 A | 3/2016 |
| CN | 105429956 A | 3/2016 |
| CN | 105897714 A | 8/2016 |
| CN | 106131016 A | 11/2016 |
| CN | 106506435 A | 3/2017 |
| CN | 106713312 A | 5/2017 |
| CN | 107392456 A | 11/2017 |
| CN | 110138764 A | 8/2019 |
| EP | 1160646 A2 | 12/2001 |
| EP | 2410452 B1 | 1/2016 |
| EP | 3343867 A1 | 7/2018 |
| GB | 2493514 A | 2/2013 |
| KR | 10-2007-0049514 A | 5/2007 |
| KR | 10-1514984 B1 | 4/2015 |
| RU | 2382400 C2 | 2/2010 |
| RU | 107616 U1 | 8/2011 |
| RU | 2446459 C1 | 3/2012 |
| RU | 129279 U1 | 6/2013 |
| RU | 2487406 C1 | 7/2013 |
| RU | 2488880 C1 | 7/2013 |
| RU | 2495486 C1 | 10/2013 |
| RU | 2522019 C1 | 7/2014 |
| RU | 2523114 C2 | 7/2014 |
| RU | 2530210 C2 | 10/2014 |
| RU | 2536664 C2 | 12/2014 |
| RU | 2538292 C1 | 1/2015 |
| RU | 2543564 C1 | 3/2015 |
| RU | 2566329 C2 | 10/2015 |
| RU | 2571594 C2 | 12/2015 |
| RU | 2589310 C2 | 7/2016 |
| RU | 164629 U1 | 9/2016 |
| RU | 2601147 C2 | 10/2016 |
| RU | 2607231 C2 | 1/2017 |
| RU | 2610586 C2 | 2/2017 |
| RU | 2613535 C1 | 3/2017 |
| RU | 2622870 C2 | 6/2017 |
| RU | 2625050 C1 | 7/2017 |
| RU | 2628192 C2 | 8/2017 |
| RU | 2634209 C1 | 10/2017 |
| RU | 2636702 C1 | 11/2017 |
| RU | 2670906 C9 | 12/2018 |
| RU | 2681699 C1 | 3/2019 |
| RU | 2697926 C1 | 8/2019 |
| RU | 2697935 C2 | 8/2019 |
| RU | 2722693 C1 | 6/2020 |
| RU | 2738335 C1 | 12/2020 |
| WO | 0245380 A2 | 6/2002 |
| WO | 2009/026564 A1 | 2/2009 |
| WO | 2011/045424 A1 | 4/2011 |
| WO | 2012/015171 A2 | 2/2012 |
| WO | 2019/010182 A1 | 1/2019 |
| WO | 2019004503 A1 | 1/2019 |
| WO | 2019/153384 A1 | 8/2019 |

OTHER PUBLICATIONS

Search Report with regard to the counterpart NL Patent Application No. 2030861 completed Dec. 16, 2022.

Office Action with regard to the counterpart U.S. Appl. No. 17/528,633 issued Dec. 8, 2023.

English Abstract of RU107616 retrieved on Espacenet on Jul. 3, 2017.

European Search Report with regard to EP17180099 completed on Nov. 28, 2017.

European Search Report with regard to EP17191900 completed on Jan. 11, 2018.

Yoshioka et al., "Sandbox Analysis with Controlled Internet Connection for Observing Temporal Changes of Malware Behavior", https://www.researchgate.net/publication/254198606, 15 pages.

Yoshioka et al., "Multi-Pass Malware Sandbox Analysis with Controlled Internet Connection", IEICE Transactions on Fundamentals of Electronics, Communications and Computer Sciences, Engineering Sciences Society, Tokyo, 2010, vol. E93A, No. 1, p.p. 210-218.

Wikipedia, "Blockchain", https://en.wikipedia.org/wiki/Blockchain, pdf document, 18 pages.

Search Report with regard to the counterpart RU Patent Application No. 2018101764 completed Jun. 29, 2018.

Search Report with regard to the counterpart RU Patent Application No. 2018101761 completed Jun. 20, 2018.

International Search Report with regard to the counterpart Patent Application No. PCT/RU2016/000526 mailed Jun. 1, 2017.

European Search Report with regard to the counterpart EP Patent Application No. EP17210904 completed May 16, 2018.

Search Report with regard to the counterpart RU Patent Application No. 2018101759 completed Sep. 7, 2018.

English Abstract of RU129279 retrieved on Espacenet on Sep. 11, 2017.

English Abstract of RU164629 retrieved on Espacenet on Sep. 11, 2017.

English Abstract of RU2538292 retrieved on Espacenet on Sep. 11, 2017.

Prakash et al., "PhishNet: Predictive Blacklisting to Detect Phishing Attacks", INFOCOM, 2010 Proceedings IEEE, USA, 2010, ISBN: 978-1-4244-5836-3, doc. 22 pages.

Search Report with regard to the counterpart Patent Application No. RU2018105377 completed Oct. 15, 2018.

Search Report with regard to the counterpart RU Patent Application No. 2018101763 completed Jan. 11, 2019.

(56) References Cited

OTHER PUBLICATIONS

Search Report with regard to the counterpart RU Patent Application No. 2016137336 completed Jun. 6, 2017.
English Abstract of RU2522019 retrieved on Espacenet on Jan. 25, 2019.
Search Report with regard to the counterpart RU Patent Application No. 2017140501 completed Jul. 11, 2018.
International Search Report and Written Opinion with regard to PCT/RU2020/000044 mailed Oct. 15, 2020.
Search Report with regard to the counterpart RU Patent Application No. 2020103269 mailed Mar. 24, 2020.
Notice of Allowance with regard to the counterpart U.S. Appl. No. 16/270,341 mailed Mar. 25, 2021.
Notice of Allowance with regard to the counterpart U.S. Appl. No. 16/239,605 mailed Jan. 25, 2021.
Office Action with regard to the counterpart U.S. Appl. No. 16/270,341 mailed Dec. 4, 2020.
Search Report with regard to the counterpart RU Patent Application No. 2019142440 completed Oct. 26, 2020.
Search Report with regard to the counterpart RU Patent Application No. 2021116850 completed Feb. 17, 2022.
Notice of Allowance with regard to the counterpart U.S. Appl. No. 17/019,730 mailed Apr. 29, 2022.
Search Report with regard to the counterpart RU Patent Application No. 2021115690 completed May 19, 2022.
English Translation of CN106713312, © Questel—Fampat, Jul. 17, 2019.
English Translation of CN105897714, © Questel—Fampat, Jul. 17, 2019.
English Translation of CN106506435, © Questel—Fampat, Jul. 26, 2019.
English Translation of CN107392456, © Questel—Fampat, Jul. 29, 2019.
English Translation of CN103491205, © Questel—Fampat, Jul. 29, 2019.
English Translation of CN106131016, © Questel—Fampat, Jul. 17, 2019.
Invitation to Respond to Written Opinion with regard to the counterpart SG Patent Application No. 10201900339Q.
Invitation to Respond to Written Opinion with regard to the counterpart SG Patent Application No. 10201901079U.
Invitation to Respond to Written Opinion with regard to the counterpart SG Patent Application No. 10201900335P.
Search Report with regard to the counterpart RU Patent Application No. 2018144708 completed Aug. 16, 2019.
Search Report with regard to the counterpart RU Patent Application No. 2018147431 completed Aug. 15, 2019.
English Translation of KR10-2007-0049514 (Description, Claims) retrieved on Espacenet on Oct. 15, 2019.
English Abstract of KR10-1514984 retrieved on Espacenet on Oct. 15, 2019.
Office Action with regard to the counterpart U.S. Appl. No. 16/261,854 mailed Oct. 21, 2019.
Notice of Allowance with regard to the counterpart U.S. Appl. No. 15/707,641 mailed Oct. 30, 2019.
Whyte, "DNS-based Detection of Scanning Worms in an Enterprise Network", Aug. 2004, Noss, pp. 1-17 (Year: 2005)—in the Notice of Allowance with regard to the counterpart U.S. Appl. No. 15/707,641.
Office Action with regard to the counterpart U.S. Appl. No. 15/858,013 mailed Nov. 22, 2019.
Search Report with regard to the counterpart SG Patent Application No. 10201900062S mailed Dec. 5, 2019.
Search Report with regard to the counterpart SG Patent Application No. 10201900060Y mailed Dec. 5, 2019.
English Abstract for CN105429956 retrieved on Espacenet on Jan. 7, 2020.
English Abstract for CN104504307 retrieved on Espacenet on Jan. 7, 2020.
Office Action received with regard to the counterpart U.S. Appl. No. 15/858,032 mailed Apr. 6, 2020.
Office Action with regard to the counterpart U.S. Appl. No. 16/270,341 mailed May 27, 2020.
Notice of Allowance with regard to the counterpart U.S. Appl. No. 15/858,013 mailed May 8, 2020.
English Abstract for CN105429955 retrieved on Espacenet on Jul. 13, 2020.
European Search Report with regard to the counterpart EP Patent Application No. EP17211131 completed Apr. 12, 2018.
Search Report with regard to the counterpart RU Patent Application No. 2018101760 completed Jun. 22, 2018.
Office Action with regard to the counterpart U.S. Appl. No. 15/707,641 mailed Apr. 25, 2019.
Notice of Allowance with regard to the counterpart U.S. Appl. No. 15/858,013 mailed Jun. 10, 2020.

* cited by examiner

240

241 Obtaining the names of web services from the list of web services, taking a hash function from each of them and storing the result in the list

242 Checking the availability of each of the obtained hashes in the hash storage of malicious web services, and in response to detection of at least one of the obtained hashes in the hash storage of malicious web services, adding the list of detected malicious web services

243 Finding at least one suspicious IP address in the Internet graph model

244 Identifying a graph model fragment comprising all the elements associated with at least one suspicious IP address

245 Applying at least one clearing algorithm to the identified graph model fragment

246 Taking a hash function for each vertex of the cleared graph model fragment and storing the result in the list

247 Checking the availability of each of the obtained hashes in the hash storage of malicious web services, and in response to detection of at least one of the obtained hashes in the hash storage of malicious web services, adding the list of detected malicious web services

FIG. 2B

SYSTEM AND METHOD FOR DETECTION OF MALICIOUS NETWORK RESOURCES

CROSS-REFERENCE

The present application claims priority to a Russian Patent Application No.: 2021116850, filed on Jun. 10, 2021, and entitled "SYSTEM AND METHOD FOR ACTIVE DETECTION OF MALICIOUS NETWORK RESOURCES", the content of which is incorporated herein by reference in its entirety.

FIELD

The present technology relates broadly to the field of cybersecurity, and, in particular, to systems and methods for detection of malicious network resources.

BACKGROUND

Various computing resources of a given network infrastructure can be compromised. For example, a workstation disposed within the given network infrastructure can be compromised during a phishing attack. The malwares, installed in the workstation because of the compromise, can be configured to exchange instructions with an external network resource, the malefactor's server.

Detection of such an exchange of instructions between one of the internal devices of the protected infrastructure and an external server belonging to the malefactor can be indicative of the infrastructure compromise.

The traditional approach to detection of such situations is based on the analysis of traffic, i.e., the information which the computing devices constituting this infrastructure exchange with each other, and also with the external network devices.

The traditional approach usually includes placing the suspected computing device inside the protected infrastructure, for example, a server that performs the traffic receiving and analyzing functions. As a result of the analysis, traffic anomalies are detected, that is, the data indicating that at least one device, being the part of the protected infrastructure, performs a typical, "anomalous" operations (for example, data exchange with an external device belonging to a malefactor), which is considered an indicator of compromise.

The traffic itself may look, for example, as follows:

```
{"ts":1607594574.388979,"uid":"CpuE6k2FNg9n3hbQel","id.orig_h":"111.222.333.444"
,"id.orig_p":12238,"id.resp_h":"167.172.158.20","id.resp_p":443,"proto":"tcp","service":
"ssl","duration":103.96006202697754,"orig_bytes":14136,"resp_bytes":202748,"conn_st
ate":"S1","missed_bytes":0,"history":"ShADad","orig_pkts":76,"orig_ip_bytes":17188,"r
esp_pkts":208,"resp_ip_bytes":122280,"service_count":0,"ts_last_usage":1607594574.38
8979}
{"ts":1607594574.388979,"uid":"CpuE6k2FNg9n3hbQel","id.orig_h":"111.222.333.444"
,"id.orig_p":12238,"id.resp_h":"167.172.158.20","id.resp_p":443,"proto":"tcp","service":
"ssl","duration":119.43929314613342,"orig_bytes":14934,"resp_bytes":204104,"conn_st
ate":"S1","missed_bytes":0,"history":"ShADad","orig_pkts":82,"orig_ip_bytes":18226,"r
esp_pkts":216,"resp_ip_bytes":212756,"service_count":0,"ts_last_usage":1607594574.38
8979}
```

At the same time, It should be noted that almost all traffic, both legitimate and malicious, can be encrypted. This means that direct "reading" of data can be very challenging. Therefore, the common approach to traffic analysis involves the use of machine learning; models are trained in one way or another on the basis of knowingly legitimate traffic, and they help to detect situations when traffic ceases to resemble the legitimate one.

However, certain currently known methods of traffic analysis by machine learning have a serious problem: with this approach, false-positive responses often occur when legitimate traffic is identified as being a malicious one. Internal computing devices legitimately exchange information with external legitimate computing devices (for example, web servers of contracting companies, online stores, etc.), but some features of this traffic trigger the traffic analysis systems that generate a warning about potential compromise of the infrastructure. This creates a significant unjustified burden on cybersecurity systems and seriously complicates practical application of such solutions.

Certain prior art approaches have been proposed to tackle the above-identified technical problem.

U.S. Pat. No. 8,533,819-B2 issued on Sep. 10, 2013, assigned to AT&T Corp. AT&T Intellectual Property II LP, and entitled "METHOD AND APPARATUS FOR DETECTING COMPROMISED HOST COMPUTERS", discloses a method and apparatus for detecting compromised host computers (e.g., Bots). For example, the method identifies a plurality of suspicious hosts. Once identified, the method analyzes network traffic of the plurality suspicious hosts to identify a plurality suspicious hub-servers. The method then classifies the plurality of candidate Bots into at least one group. The method then identifies members of each of the at least one group that are connected to a same controller from the plurality suspicious controllers, where the members are identified to be part of a Botnet.

U.S. Pat. No. 7,512,980-B2 issued on Mar. 31, 2009, assigned to Cisco Technology Inc., and entitled "PACKET SAMPLING FLOW-BASED DETECTION OF NETWORK INTRUSIONS", discloses a flow-based intrusion detection system for detecting intrusions in computer communication networks. Data packets representing communications between hosts in a computer-to-computer communication network are processed and assigned to various client/server flows. Statistics are collected for each flow. Then, the flow statistics are analyzed to determine if the flow appears to be legitimate traffic or possible suspicious activity. A concern index value is assigned to each flow that appears suspicious. By assigning a value to each flow that appears suspicious and adding that value to the total concern index of the responsible host, it is possible to identify hosts that are engaged in intrusion activity. When the concern index value of a host exceeds a preset alarm value, an alert is issued and appropriate action can be taken.

U.S. Pat. No. 9,043,920-B2 issued on May 26, 2015, assigned to Tenable Inc, and entitled "SYSTEM AND METHOD FOR IDENTIFYING EXPLOITABLE WEAK POINTS IN A NETWORK", discloses a system and method to identify network addresses and open ports associated with connections that one or more passive scanners observed in a network and current connections that one or more active scanners enumerated in the network. The observed and enumerated current connections may be used to model trust relationships and identify exploitable weak points in the network, wherein the exploitable weak points may include hosts that have exploitable services, exploitable client software, and/or exploitable trust relationships. Furthermore, an attack that uses the modeled trust relationships to target the exploitable weak points on a selected host in the network may be simulated to enumerate remote network addresses that could compromise the network and determine an exploitation path that the enumerated remote network addresses could use to compromise the network.

U.S. Pat. No. 10,630,674-B2 issued on Apr. 21, 2020, assigned to Citrix Systems Inc, and entitled "SYSTEMS AND METHODS FOR PERFORMING TARGETED SCANNING OF A TARGET RANGE OF IP ADDRESSES TO VERIFY SECURITY CERTIFICATES", discloses systems and methods for scanning of a target range of IP addresses to verify security certificates associated with the target range of IP addresses. Network traffic may be monitored between a plurality of clients and a plurality of servers over an IP address space. Traffic monitors positioned intermediary to the plurality of client and the plurality of servers can identify a target range of IP addresses in the address space for targeted scanning. The target range of IP address may be grouped into a priority queue and a scan can be performed of the target range of IP addresses to verify a security certificate associated with each IP address in the target range of IP addresses. In some embodiments, a rogue security certificate is detected that is associated with at least one IP address in the target range of IP addresses.

Russian Patent No.: 2,722,693-C1 issued on Jun. 3, 2020, assigned to Group-IB TDS LLC, and entitled "METHOD AND SYSTEM FOR DETECTING THE INFRASTRUCTURE OF A HARMFUL PROGRAM OR CYBERSHIP", discloses a method for detecting the infrastructure of a malicious program or a malefactor, wherein a request is received, the request comprising the infrastructure element and a tag on this element belonging to the malicious program or a malefactor; on the basis of further analysis of this data, the method further includes determining the connections of the obtained element with other elements of the infrastructure belonging to certain malicious programs or malefactors, thus detecting this infrastructure.

U.S. Pat. No. 10,284,595-B2 issued on May 7, 2019, assigned to Citrix Systems Inc, and entitled "COMBINING INTERNET ROUTING INFORMATION WITH ACCESS LOGS TO ASSESS RISK OF USER EXPOSURE", discloses systems and methods for evaluating or mitigating a network attack. A device determines one or more client internet protocol addresses associated with the attack on the service. The device assigns a severity score to the attack based on a type of the attack. The device identifies a probability of a user account accessing the service during an attack window based on the type of attack. The device generates an impact score for the user account based on the severity score and the probability of the user account accessing the service during the attack window. The device selects a mitigation policy for the user account based on the impact score.

SUMMARY

It is the object of the present technology to ameliorate at least some of the inconveniences present in the prior art.

The present methods and systems are directed to improving the accuracy of detecting indicators of compromise in the protected infrastructure by malefactors or malicious programs.

More specifically, the systems and methods described herein allow for active detection of malicious network resources by use of an external computing device, which is disposed outside the protected network infrastructure and is configured to communicate with the infrastructure devices.

Thus, in accordance with a first broad aspect of the present technology, there is provided a computer-implementable method for detection of malicious network resources. The method is executable by a first computing device of a distributed computer system. The first computing device is disposed inside of a perimeter of the distributed computer system. The first computing device is configured to communicatively connect to a second computing device of the distributed computer system, the second computing device being disposed outside of the perimeter of the distributed computer system. The method comprises: receiving, by a communication module of the first computing device, an outbound traffic of the distributed computer system, detecting, by a first analysis module of the first computing device, at least one suspicious external IP address in the outbound traffic, scanning, by a scanning module of the first computing device, at least one suspicious device located at the detected at least one suspicious IP address to obtain a list of services running on the at least one suspicious device, transmitting, by the communication module of the first computing device, the at least one suspicious IP address and the list of services to the second computing device, the transmitting being for triggering the second computing device to execute: comparing, using a second analysis module of the second computing device, the list of services with a data on known malicious services, and in response to a match between at least one service from the list of services and a respective one of the known malicious services: determining, by the second analysis module of the second computing device, the at least one suspicious device, located at the at least one suspicious IP address as being a malicious one, generating, by a notification module of the second computing device, at least one report on detection of malicious activity in the distributed computer system, in response to an absence of the match of between the at least one service from the list of services and the respective one of the known malicious services: determining, by the second analysis module of the second computing device, an interval of ownership of the at least one suspicious IP address, and in response to the interval of ownership being less than a threshold value, determining, by the second analysis module of the second computing device, the at least one suspicious device, located at the at least one suspicious IP address as being malicious one, generating, by the notification module of the second computing device, the at least one report on detection of the malicious activity in the distributed computer system, and in response to the interval of ownership exceeding the threshold value, determining, by the analysis module of the second computing device, the at least one suspicious device as being a legitimate one.

In some implementations of the method, in response to the scanning module of the first computing device being incapable of accessing the at least one suspicious device located at the at least one suspicious IP address, the method further comprises: transmitting, by the communication module of the first computing device, data about the at least one suspicious IP address to the second computing device, thereby triggering the second computing device to execute:

scanning, by a second scanning module of the second computing device, the at least one suspicious device located at the at least one suspicious IP address, and obtaining, by the second scanning module of the second computing device, the list of services running on the at least one suspicious device.

In some implementations of the method, the detecting, by the first analysis module of the first computing device, the at least one suspicious IP address in the outbound traffic comprises: detecting at least one anomalous traffic fragment in the outbound traffic, extracting, from the at least one anomalous traffic fragment, at least one IP address of a computing device to which the at least one traffic fragment is addressed, and determining the extracted at least one IP address as being the at least one suspicious IP address.

In some implementations of the method, the detecting the at least one anomalous traffic fragment in the outbound traffic, comprises applying at least one of: a deep neural network having been trained on a tagged traffic, a One-ClassSVM classifier having been trained on legitimate traffic samples, machine learning models, including at least one of: a Random Forest Classifier, an XGBoost machine-learning model, a KNN machine-learning model, an AdaBoost machine-learning model, that have been trained on tagged samples of traffic, searching in the outbound traffic by pre-determined feature signatures, and using a sliding window approach to collect statistical features of traffic logs of the outbound traffic.

In some implementations of the method, the triggering the second computing device to execute the comparing the list of services with the data on the known malicious services comprises triggering the second computing device to use a network graph model of a communication network to which the distributed computer system is coupled.

In some implementations of the method, the triggering the second computing device to execute the determining the interval of ownership of the at least one suspicious IP address comprises triggering the second computing device to use historical data on activity of IP addresses of a communication network to which the distributed computer system is coupled.

In some implementations of the method, the transmitting is for further triggering the second computing device to transmit the at least one generated report on detection of the malicious activity in the distributed computer system to an operator thereof, the transmitting the at least one generated report comprising transmitting using at least one of:
 an e-mail,
 an SMS,
 an MMS,
 a push notifications,
 instant messenger messages, and
 API events.

In accordance with a second broad aspect of the present technology, there is provided a computing device of a distributed computer system for detection of malicious network resources. The computing device is disposed inside of a perimeter the distributed computer system. The computing device comprises a processor and a non-transitory computer-readable medium storing instructions. The processor, upon executing the instructions, is configured to execute: receiving, by a communication module of the computing device, an outbound traffic of the distributed computer system, detecting, by an analysis module of the computing device, at least one suspicious external IP address in the outbound traffic, scanning, by a scanning module of the computing device, at least one suspicious device located at the detected at least one suspicious IP address to obtain a list of services running on the at least one suspicious device, and transmitting, by the communication module of the computing device, the at least one suspicious IP address and the list of services to an other computing device of the distributed computer system, which is disposed outside the perimeter of the distributed computer system, the transmitting being for triggering the other computing device to execute: receiving, form the computing device, the at least one suspicious IP address and the list of services running on the at least one suspicious device; comparing, the list of services with a data on known malicious services, and in response to a match between at least one service from the list of services and a respective one of the known malicious services: determining the at least one suspicious device, located at the at least one suspicious IP address as being a malicious one, generating at least one report on detection of malicious activity in the distributed computer system, in response to an absence of the match of between the at least one service from the list of services and the respective one of the known malicious services: determining an interval of ownership of the at least one suspicious IP address, and in response to the interval of ownership being less than a threshold value, determining the at least one suspicious device, located at the at least one suspicious IP address as being malicious one, and generating the at least one report on detection of the malicious activity in the distributed computer system, and in response to the interval of ownership exceeding the threshold value, determining the at least one suspicious device as being a legitimate one.

In the context of the present specification, the term "network resources" denotes computing devices, i.e., software and hardware complexes configured to exchange data within a computer network, for example, the Internet, and located within the network infrastructure. In a particular example, a given network resource, in terms of this application, could be a workstation connected to a local area network. Also, the given network resource could be a laptop, netbook, tablet, smartphone, Internet of Things (IoT) device, server, router, firewall, or, without limitation, any other software and hardware solution that meets the above criteria.

In the context of the present specification, the term "network infrastructure" denotes a set of software and hardware creating the basis for effective data communication, which could be targeted by malefactors. This could be, for example, a corporate computer network containing servers, workstations, routers, etc.

Thus, the network infrastructure can be said to define a so-called perimeter, i.e, a conditional border formed by the network architecture itself, by the settings of the hardware and software used, and enabling to separate the network resources located "inside" the infrastructure, such as a workstation of one of the company's computer network users, and resources located "outside", for example, servers used for google.com site hosting. Within the scope of this specification the first devices are called internal network devices, and the second ones—external network devices.

Further, in the context of the present specification, the term "malicious network resource" denotes an external network resource, that is, the one located "outside" the infrastructure and belonging to a malefactor. At the same time, there can be at least one compromised network resource "inside" the infrastructure, that is, the one that was originally intended to perform legitimate tasks, but then has been compromised by the malefactor or malware.

In the context of the present specification, unless expressly provided otherwise, a computer system may refer, but is not limited, to an "electronic device", an "operation system", a "system", a "computer-based system", a "controller unit", a "control device" and/or any combination thereof appropriate to the relevant task at hand.

In the context of the present specification, unless expressly provided otherwise, the expression "computer-readable medium" and "memory" are intended to include media of any nature and kind whatsoever, non-limiting examples of which include RAM, ROM, disks (CD-ROMs, DVDs, floppy disks, hard disk drives, etc.), USB keys, flash memory cards, solid state-drives, and tape drives.

In the context of the present specification, a "database" is any structured collection of data, irrespective of its particular structure, the database management software, or the computer hardware on which the data is stored, implemented or otherwise rendered available for use. A database may reside on the same hardware as the process that stores or makes use of the information stored in the database or it may reside on separate hardware, such as a dedicated server or plurality of servers.

In the context of the present specification, unless expressly provided otherwise, the words "first", "second", "third", etc. have been used as adjectives only for the purpose of allowing for distinction between the nouns that they modify from one another, and not for the purpose of describing any particular relationship between those nouns.

BRIEF DESCRIPTION OF THE DRAWINGS

Non-limiting embodiments of the present technology are described herein with reference to the accompanying drawings; these drawings are only presented herein to explain the essence of the technology and are not intended to limit the scope thereof in any way, where:

FIG. 2B depicts flowchart of a step of the method of FIG. 2A which is caused to be executed by a computing device disposed outside the network infrastructure of FIG. 1, in accordance with certain non-limiting embodiments of the present technology;

DETAILED DESCRIPTION

The following detailed description is provided to enable anyone skilled in the art to implement and use the non-limiting embodiments of the present technology. Specific details are provided merely for descriptive purposes and to give insights into the present technology, and in no way as a limitation. However, it would be apparent to a person skilled in the art that some of these specific details may not be necessary to implement certain non-limiting embodiments of the present technology. The descriptions of specific implementations are only provided as representative examples. Various modifications of these embodiments may become apparent to the person skilled in the art; the general principles defined in this document may be applied to other non-limiting embodiments and implementations without departing from the scope of the present technology.

System

Figure 1:
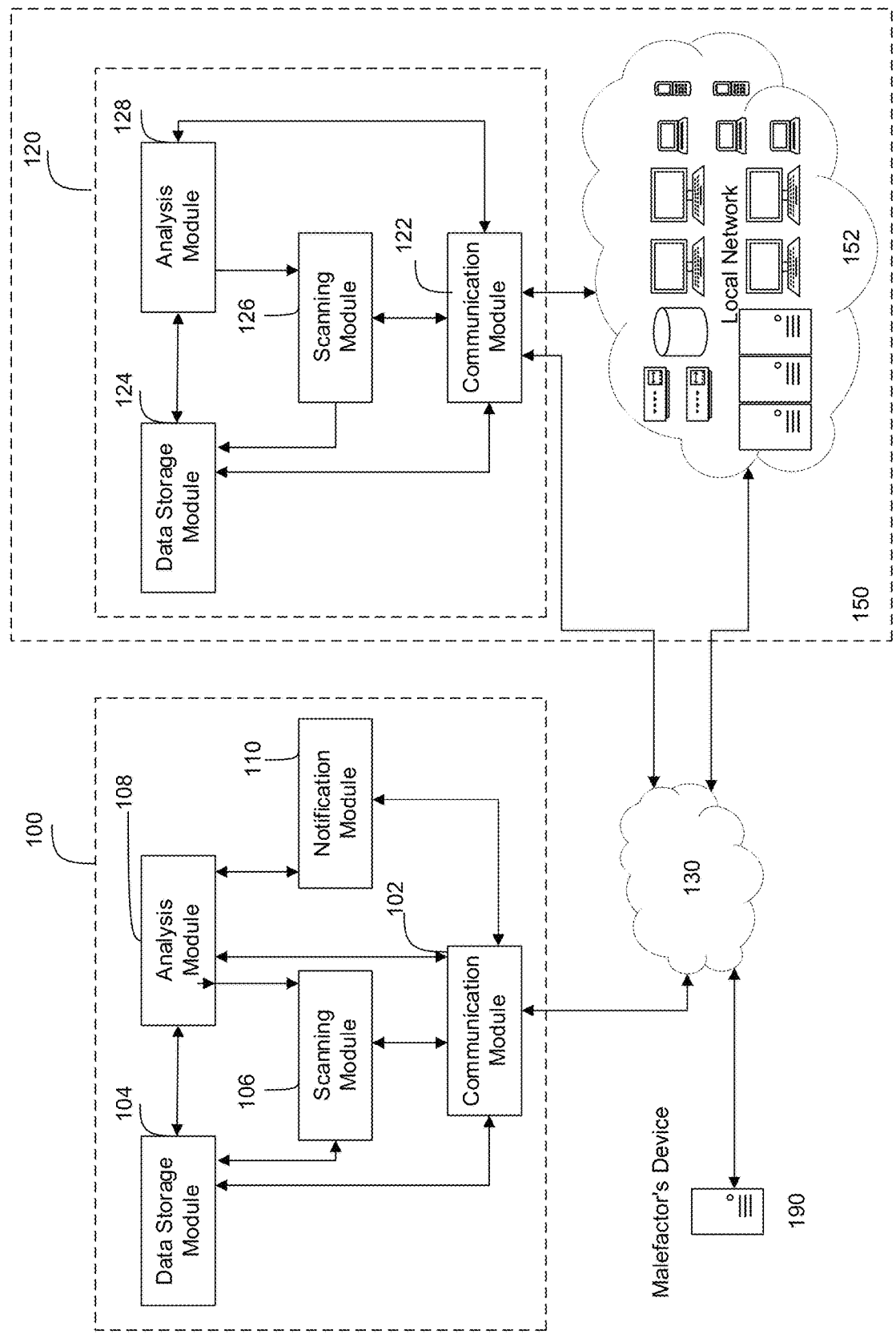
FIG. 1 depicts a schematic diagram of a network infrastructure, in accordance with certain non-limiting embodiments of the present technology.

With reference to FIG. 1, there is depicted a schematic diagram of a network infrastructure 150, in accordance with certain non-limiting embodiments of the present technology. As it can be appreciated, the network infrastructure 150 includes (1) an external computing device (100), that is, disposed outside a perimeter of the network infrastructure 150, and (2) an internal computing device (120), which is installed within the perimeter of the network infrastructure (150) to be protected.

Design and hardware configuration of this computing devices could be any commonly known ones enabling to ensure execution of the functions described below. This could be, by way of example, but not limited to, servers such as Dell™ PowerEdge™ hardware servers. In alternative non-limiting embodiments of the present technology, the external computing device (100) could be a cloud solution, i.e, a set of servers, and the internal computing device (120) could be, for example, a laptop, workstation or mobile device, such as a smartphone. But in any case, the external (100) and internal (120) computing devices can be configured to exchange traffic among themselves via a communication network. Additionally, the internal device (120) can be configured to exchange traffic with the devices of the network infrastructure (150) over a local network 152 organized within the network infrastructure (150). Thus, each one of the external computing device 100 and the internal computing device 120 can include all or some of components of a computing environment 500 described herein below with reference to FIG. 5.

It should further be understood that other devices of the network infrastructure (150) can also be configured to exchange traffic both through the communication network 130 and over the local network 152 of the network infrastructure (150).

In some non-limiting embodiments of the present technology, the communication network 130 is the Internet. In alternative non-limiting embodiments of the present technology, the communication network 130 can be implemented as any suitable local area network (LAN), wide area network (WAN), a private communication network, or the like. It should be expressly understood that implementations for the communication network 130 are for illustration purposes only. How a respective communication link (not separately numbered) between each one of the external computing device 100 and other computing devices disposed within the perimeter of the network infrastructure 150, such as the internal computing device 120, and the communication network 130 is implemented will depend, inter alia, on how each of these computing devices is implemented. Merely as an example and not as a limitation, in those embodiments of the present technology where the internal computing device 120 is implemented as a wireless communication device such as the smartphone, the communication link can be implemented as a wireless communication link. Examples of wireless communication links include, but are not limited to, a 3G communication network link, a 4G communication network link, and the like. The communication network 130 may also use a wireless connection with the external computing device 100.

Further, according to non-limiting embodiments of the present technology, there can be communicatively coupled to the network infrastructure 150, via the communication network 130, a malefactor's computing device (190), which can be, for example, a compromised server. Thus, the malefactor's computing device 190 can be configured to exchange data with components of the network infrastructure (150).

Further, according to non-limiting embodiments of the present technology, the external computing device (100) can comprise at least one of: a first communication module (102), a first data storage module (104), a first scanning module (106), a first analysis module (108), and also a first notification module (110).

Similarly, in some non-limiting embodiments of the present technology, the internal computing device (120) can comprise at least one of: a second communication module (122), a second data storage module (124), a second scanning module (126), and also a second analysis module (128).

The listed modules in terms of their technical implementation could be software modules executed on one computing device, software and hardware modules, for example, at least some of these modules could be implemented as dedicated servers, with each of them performing a corresponding function, or represent a combination thereof.

The first communication module (102) of the external computing device (100) is configured to exchange data with the first data storage module (104), the first scanning module (106), the first analysis module (108), and also the first notification module (110). The first communication module (102) enables the external computing device 100 to communicate with a computer network, for example, with the communication network (130). In turn, the first communication module 102 provides communication between one of the external computing device (100), implementing this method, with the network infrastructure (150), including the internal computing device (120), using the communication network 130. Besides, via the communication network 130, the first communication module (102) enables the external computing device (100) to obtain additional information, in particular, data on known malicious services and certificates, about various IP addresses and domains, and also their various parameters, such as registration date, compliance of a domain name with an IP address, etc.

The second communication module (122) of the internal computing device (120) is configured to exchange data with the second data storage module (124), the second scanning module (126), the second analysis module (128), and also with all the other devices of the network infrastructure (150). The second communication module (122) enables the computing device (120) to communicate with the external computing device (100) via a computer network, for example, the communication network 130, and with the other devices of the network infrastructure (150) via the local network (152).

The first data storage module (104) of the external computing device (100) is configured to exchange data with the first communication module (102), the first scanning module (106) and the first analysis module (108). The first data storage module (104) provides both permanent and temporary storage of information. For this purpose, the first data storage module (104) comprises at least one database (not shown in FIG. 1), which allows to store information orderly and to carry out search. Such a database could comprise, by way of example, but not limited to, all historical data available for each IP address: open ports, running services, associated domains, data on known malicious services, and also a graph model of the communication network 130. The first data storage module (104) could also store program instructions, which execution enables the external computing device (100) to implement the methods described herein.

The second data storage module (124) of the internal computing device (120) is configured to exchange data with the second communication module (122), the second scanning module (126) and the second analysis module (128). The second data storage module (124) provides both permanent and temporary storage of information. For this purpose, the second data storage module (124) comprises at least one database (not shown in FIG. 1), which allows to store information orderly and to carry out search. The second data storage module (124) could also store program instructions, which execution enables the internal computing device (120) to implement the methods described herein.

The first scanning module (106) of the external computing device (100) is configured to exchange data with the first communication module (102), the first data storage module (104) and the first analysis module (108). The first scanning module (106) is also configured to scan other computing devices connected to the communication network 130, for example, the malefactor's computing device (190), and obtain information about the services running on the ports of each scanned device.

The second scanning module (126) of the internal computing device (120) is configured to exchange data with the second communication module (122), the second data storage module (124) and the second analysis module (128). The second scanning module (126) is also configured to scan other computing devices connected to the communication network 130, for example, such as a malefactor's computing device (190), and obtain information about the services running on the ports of each scanned device.

The first analysis module (108) of the external computing device (100) is configured to exchange data with the first communication module (102), the first scanning module (106), the first data storage module (104) and the first notification module (110). The first analysis module (108) checks the lists of services received from the first communication module (102) or from the first scanning module (106) for belonging to known malicious services. Besides, the first analysis module (108) computes the IP address ownership interval, that is, the time interval during which some domains referred to this IP address, or some ports were opened on this IP address. Implementation of these functions by the first analysis module (108) will be described below with reference to FIG. 2B, FIG. 3A, FIG. 4.

The second analysis module (128) of the internal computing device (120) is configured to exchange data with the second communication module (122), the second scanning module (126) and the second data storage module (124). The second analysis module (128) detects anomalies in the traffic received from the second communication module (122), and also identifies the IP addresses of external computing devices which the anomalous traffic was addressed to, for example, such as the malefactor's computing device (190).

The first notification module (110) of the external computing device (100) is configured to exchange data with the first analysis module (108) and the first communication module (102). The first notification module (110) generates and transmits, using the first communication module (102), the notification of a potential compromise of the network infrastructure 150 by at least one of the following methods: by e-mail, by sending SMS, by sending MMS, by sending a push notification, by a message in an instant messenger, by creating an API event.

Methods for detecting malicious network resources in the network infrastructure 150 will now be described in greater detail.

Methods

Figure 2A:
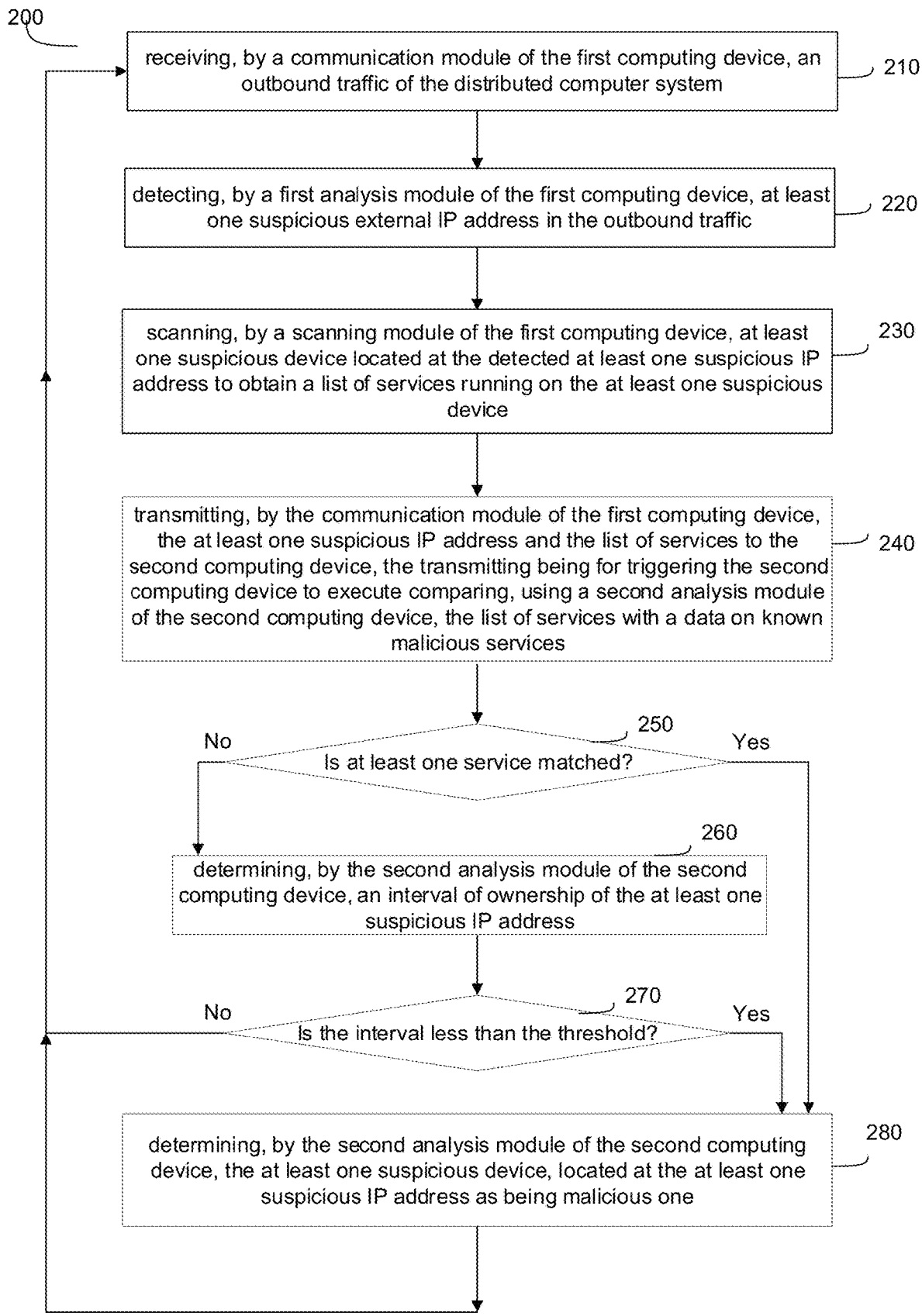
FIG. 2A depicts flowchart of a method for detecting malicious network resources in the network infrastructure of FIG. 1, in accordance with certain non-limiting embodiments of the present technology.

With reference to FIG. 2A, there is depicted a schematic diagram of a method 200 for detecting malicious network resources, in accordance with certain non-limiting embodiments of the present technology. As mentioned above, the method 200 can be executed by a processor 501 of the internal computing device 120, as an example.

Step 210: Receiving, by a Communication Module of the First Computing Device, an Outbound Traffic of the Distributed Computer System The method (200) begins at step (210) with the second communication module (122) of the internal computing device 120 being configured to receive outbound traffic of the network infrastructure (150). This could be done by any well-known method; for example, some of the routers included in the network infrastructure (150) could be configured to mirror all outbound traffic of the network infrastructure (150) to one of the ports of the second communication module (122).

Further, the second communication module (122) can be configured to transmit the received outbound traffic received to the second analysis module (128) for analysis. The method (200) thus proceeds to step (220).

Step 220: Detecting, by a First Analysis Module of the First Computing Device, at Least One Suspicious External IP Address in the Outbound Traffic At the step (220), the second analysis module (128) of the internal computing device 120 can be configured to detect at least one suspicious external (global) IP address in the outbound traffic.

It is not limited how the second analysis module (128) of the internal computing device (120) can be configured to analyze the received outbound traffic analysis to identify at least one suspicious external IP-address therein. For example, if at least one anomalous traffic fragment is detected in the outbound traffic, then at least one IP address of a computing device which is an addressee of this at least one traffic fragment is addressed, can be extracted from that anomalous traffic fragment by the second analysis module (128) of the internal computing device (120). Said at least one external IP address can be identified as being a suspicious one.

Also, the second analysis module (128) can be configured to detect the at least one anomalous traffic fragment in the outbound traffic in various ways. For example, to that end, in some non-limiting embodiments of the present technology, the second analysis module 128 can be configured to apply at least one of:
 a deep neural network preliminarily trained on the tagged traffic,
 of OneClassSVM classifier preliminarily trained on legitimate traffic samples,
 machine learning models, such as RandomForestClassifier, XGBoost, KNN, AdaBoost, etc., preliminarily trained on tagged samples of traffic,
 searching in the outbound traffic for preformed feature signatures, and sliding window method and collecting statistical features from the traffic logs, Further, the second analysis module 128 can be configured to extract from the anomalous traffic fragment, at least one external (global) IP address of the device-recipient, for example, the IP address 111.222.333.444, which is associated with this anomalous traffic fragment, and therefore, can further be identified as being suspicious, and also the port address, for example, the port 50050. It can be appreciated that the IP address can be extracted directly from the anomalous traffic fragment as each traffic fragment (packet or datagram) includes an IP address of the source, that is, the computing device from which this traffic fragment has been sent, address of the port where the service generated this fragment is running, and also an IP address and the port of an external computing device where this traffic fragment is addressed to, such as, for example, a malefactor's server (190).

Upon detecting the at least one suspicious IP address, the method (200) proceeds to step (230).

Step 230: Scanning, by a Scanning Module of the First Computing Device, at Least One Suspicious Device Located at the Detected at Least One Suspicious IP Address to Obtain a List of Services Running on the at Least One Suspicious Device At step (230), the second scanning module 126 of the internal computing device 120 can be configured to scan at least one suspicious device, such as, for example, a malefactor's computing device (190), located at the at least one suspicious external (global) IP-address, for example, IP address 111.222.333.444, identified at step 220. Further, the second scanning module 126 can be configured to generate a list of ports open on this IP address, a list of web services running on these ports and software versions corresponding to these web services.

Thus, in contrast to passive methods for detecting malicious activity, according to which they are limited to traffic collection and analysis, and do not have an impact on a suspicious device, the method 200 described herein also performs an active action aimed at identifying the suspicious device, and further scanning this device.

In some non-limiting embodiments of the present technology, the second scanning module 126 can be configured to scan all ports that could be open on a given suspicious IP address.

In other non-limiting embodiments of the present technology, the second scanning module 126 can be configured to scan ports which are predetermined. For example, a list of ports that are most often used by malefactors, for example, such ports as 22, 80, 443, 2022, 8443, etc., is stored in the database of the second data storage module (124), and also the port where at least one abnormal traffic fragment is addressed to, in this example it is the port 50050.

In order to obtain a list of open ports, a so-called port scanner is used, i.e., implementation of an algorithm built, for example, on the known principles of SYN, TCP, UDP, ACK or FIN-scanning, or on any other known principles of port scanning, enabling to distinguish an open port from a closed one.

For each suspicious IP address, using a pre-configured script, the port scanner can be configured to obtain a list of ports currently open on a given IP address and also names (identifiers) and versions of the web services running thereon, and store this list in the database of the second data storage module (124).

In some non-limiting embodiments of the present technology, the second scanning module 126 can further be configured to use network utilities supplied with some operating systems, such as netstat and nmap utilities, to determine the state of the ports.

In this case, according to certain non-limiting embodiments of the present technology, scanning of an external suspicious computing device located on an external suspicious IP-address, such as, that of the malefactor's computing device (190), is performed by a computing device located in the same local network, inside the network infrastructure (150) as the compromised device which a malefactor intends to exchange instructions with. Malefactor's abilities to block such scanning are extremely limited.

First, a malefactor will not know from which internal (local) IP address of the network infrastructure 150 the scanning is performed, because the internal (local) IP addresses during such scanning are always hidden, since their routing in the global Internet is impossible. Therefore, a malefactor, when trying to determine the scanning source, will only see the external (global) IP address of the same infrastructure, where the device compromised by the malefactor is located. Secondly, the malefactor will also not be able to block such scanning, because when it blocks traffic from the external (global) IP address of the network infrastructure (150), the internal computing device 120 compromised by the malefactor will lose the ability of connecting to the malefactor's computing device (190), and the malefactor will lose the communication with this compromised device.

As a result of step (230), the second scanning module 126 can be configured to obtain there the list of web services running on open ports of the at least one computing device having the at least one suspicious IP address, such as that of the malefactor's computing device (190). By way of non-limiting example, such a list may look as follows:

puting device 100 to compare, using the first analysis module 108 thereof, the list of web services with services known to be malicious.

It should be noted that the data on known malicious web services could be preliminarily stored in the database of the first data storage module (104) of the external device (100). Moreover, the external device (100) could be configured to receive updates and additions to the information about known malicious web services periodically, for example, once an hour or once a day, via the first communication module (102), and store these updates and additions in the database of the first data storage module (104).

For example, in some non-limiting embodiments of the present technology, the data on the known malicious web services stored in the database of the first data storage module (104) of the external computing device (100), in particular, include the hash storage of the malicious web services. Hash, in this case, is the result of taking a hash function according to some predetermined algorithm, for example, according to the SHA256 algorithm, from the names of malicious web services or web services, the use of which may be indicative of the protected infrastructure compromise, and also from IP addresses used by malicious web services, and SSL/TLS certificates used by malicious web services.

In this case, in some non-limiting embodiments of the present technology, the first analysis module (108) can be configured to access a pre-built and periodically updated Internet graph model, such as an Internet graph model, described in detail below with reference to FIG. 3A. It should be noted that this is a simplified example given for ease of understanding, therefore, it conventionally does not show a number of graph vertices that could be present in the practical embodiment of such a graph model. In some

- port 111.222.333.444:22 is open, SSH-2.0-OpenSSH_7.9p1 Ubuntu-10 is running,
- port 111.222.333.444:69 is open, Cisco TFTP Server v.1.1 FTP server is running,
- port 111.222.333.444:443 is open, web service name is not available, (1)
- port 111.222.333.444:4899 is open, Radmin Server v.3.5.2 web service is running,
- port 111.222.333.444:8080 is open, Apache Tomcat v.3.3.2 web server is running,
- port 111.222.333.444:50050 is open, the service name is not available.

The method 200 hence advances to step 240.

Step 240: Transmitting, by the Communication Module of the First Computing Device, the at Least One Suspicious IP Address and the List of Services to the Second Computing Device, the Transmitting being for Triggering the Second Computing Device to Execute Comparing, Using a Second Analysis Module of the Second Computing Device, the List of Services with a Data on Known Malicious Services At step 240, according to non-limiting embodiments of the present technology, the first communication module 122 of the internal computing device 120 can be configured to transmit the at least one suspicious external (global) IP address and the list of web services running on open ports of at least one computing device having this IP address to the external computing device (100). By so doing, the internal computing device 120 can be configured to trigger the external computing device 100 to execute further steps directed to detecting the malicious network resources described hereinbelow.

More specifically, according to certain non-limiting embodiments of the present technology, by transmitting the above data, the processor 501 of the internal computing device 120 can be configured to trigger the external computing device 100 to compare, using the first analysis module 108 thereof, the list of web services with services known to be malicious.

non-limiting embodiments of the present technology, the Internet graph model 300 can be stored in the database of the first data storage module (104) of the external device (100).

Figure 3A:
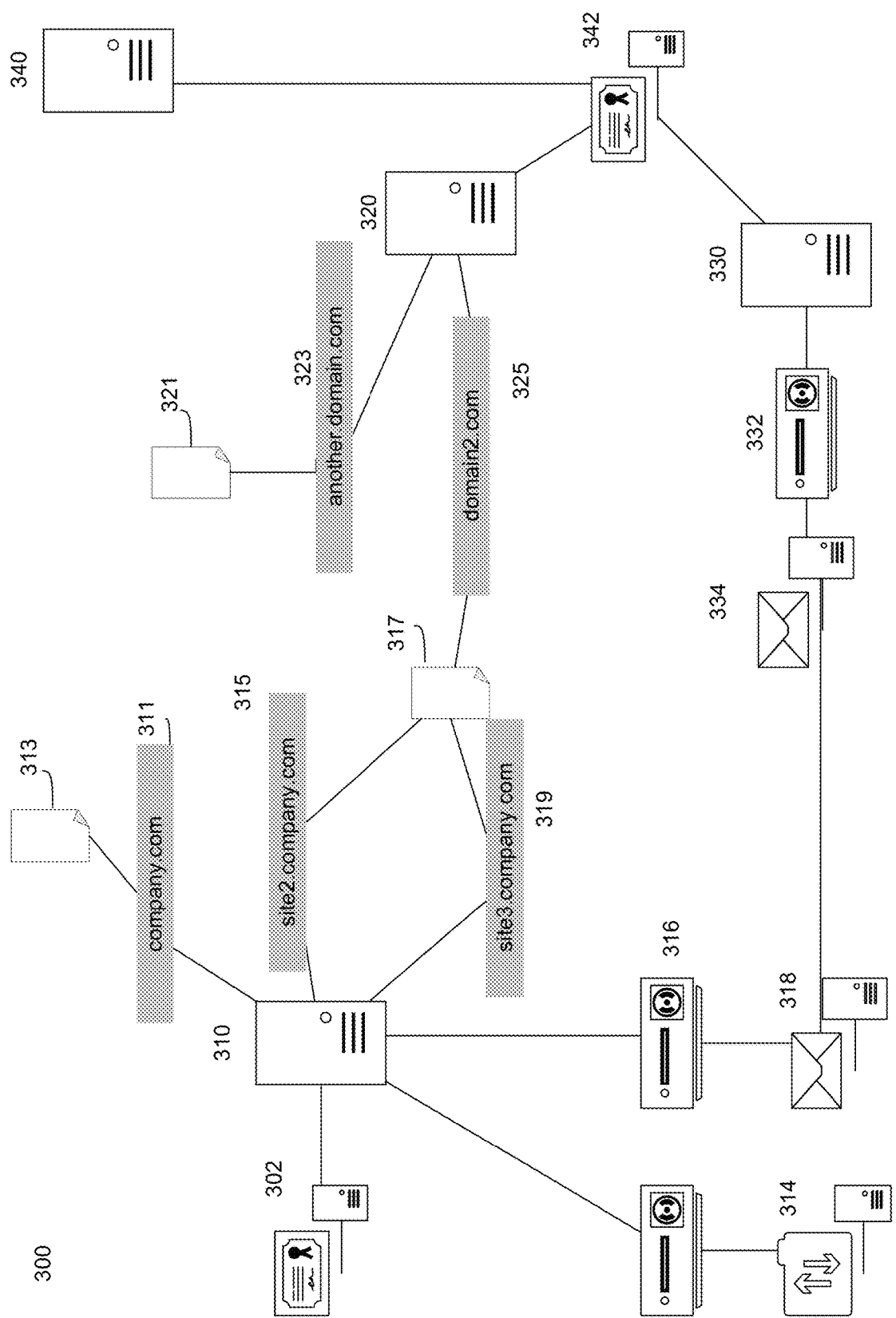
FIG. 3A depicts an example of a fragment of an Internet graph model used for identifying the network infrastructure of FIG. 1, in accordance with certain non-limiting embodiments of the present technology.

As best illustrated in FIG. 3A, the Internet graph model (300) is a graph, whose vertices are representative of infrastructure elements of the network infrastructure 150 and the parameters of these elements. Such elements of the network infrastructure 150 can include, for example, IP addresses (310), (320), (330), (340), domains (311), (315), (319), (323), (325), ports (312), (316), (332), web services running on these ports (314), (318), (334), SSL and TLS certificates (313), (317), (321) etc. The parameters of the elements of the network infrastructure 150 could be, for example, owners of IP addresses (302), (342), dates of IP address registration (not shown), dates of SSL and TLS certificates creation and expiration (not shown), etc.

According to certain non-limiting embodiments of the present technology, the external computing device 100 can be configured to identify the graph vertices at the stage of model building while crawling the communication network 130. This crawling enables to obtain information about availability, status and parameters of each of the listed elements of the network infrastructure 150.

The graph edges are the links identified during analysis of the said Internet crawling results. In this case, a link corresponds to a match of parameters of different elements of the network infrastructure 150. Building links between the vertices could be executed by any well-known method, for example, as described in patent RU2681699 issued on Mar. 12, 2019, assigned to Trust LLC, and entitled "METHOD AND SERVER FOR SEARCHING RELATED NETWORK RESOURCES", where identifying at least first linked element (corresponding to a respective graph vertex) and at least second linked element second network resource (corresponding to a respective other graph vertex); retrieving information about the identified network infrastructure elements, including at least one parameter of the at least first linked element and at least one parameter of the at least second linked element; and in response to the fact that at least one parameter of the at least first linked element matches at least one parameter of the at least second linked element, building a link between the at least first linked element resource and the at least second linked element (an edge between two vertices of the graph).

Thus, with continued reference to FIG. 3A, the external computing device 100 can be configured to determine links between the graph vertices corresponding to the IP addresses (320), (330) and (340) since these three addresses belong to one and the same owner (342). Further, the external computing device 100 can be configured to determine links between vertices corresponding to domains (315), (319) and (325) because one and the same SSL certificate (317) is installed on the websites having these domain names.

Further, the external computing device 100 can be configured to establish links between the vertices corresponding to domains (315) and (319) since both of these domain names refer to one and the same IP address (310). Similarly, the external computing device 100 can be configured to establish links between the vertices corresponding to domains (323) and (325), since both of these domain names refer to one and the same IP address (320).

Further, the external computing device 100 can be configured to establish a link between the graph vertices corresponding to the port (316) opened at IP address (310) and port (332) opened at IP address (330), since the same web services (318), (334) are running on these ports, for example, Apache Tomcat web servers of the same v.3.3.2 version.

In additional non-limiting embodiments of the present technology, the external computing device 100 can be configured to assign, to each of the so determined links in the Internet graph model (300), a respective weight value indicative of "strength" of the link or some other parameters of the associated vertices. Determining or assignment, by the external computing device 100, of these values could be performed by any well-known method. In one non-limiting example, a link could have a greater respective weight value if it connects less elements; for example, the link between the IP address (310) and the owner of that address (302) could have a greater respective weight value than the links between the IP addresses (320), (330), (340) and their owner (342).

However, it should be noted that the respective weight values can be assigned, by the external computing device 100, to each graph edge based on other parameters as well. For example, links built from vertices corresponding to SSL certificates could have greater weight values than links built from vertices corresponding to the same web services, such as web services (318), (334). Any other known methods of computing or assigning weights to the edges of such a graph are possible without limitations.

The above-described Internet graph model 300 could be configured to be periodically replenished or enriched. The graph model replenishment or enrichment could be performed, by the external computing device 100, for example, by re-crawling the communication network 130 and analyzing the obtained data by the above-described method, as well as by alternative methods, without departing from the scope of the present technology.

For example, in some non-limiting embodiments of the present technology, the external computing device 100 can be configured to analyze the lists of domains published by domain registrars, and thus identify new domains. In another example, the external computing device 100 can be configured to analyze network traffic on the communication network 130 and extract new domain names from it. In the other example, the external computing device 100 can be configured to extract new domains from SSL certificate data, and also from the code or traffic of malicious files analyzed by third-party systems. Similarly, in yet another example, the external computing device 100 can be configured to analyze the lists of the issued SSL and TLS certificates, thus obtaining information about new certificates and domains, and enriching the graph model. Also, the external computing device 100 can be configured any method to conduct the above-mentioned analysis of the lists, network traffic, malicious file code and certificates without departing from the scope of the present technology.

The Internet graph model 300, created in advance and constantly replenished in this way, is a part of the first analysis module (108), using which, at step (220), the external computing device 100 can be configured to identify the checkpoints of the network infrastructure (150), namely, the related domain names, IP addresses, SSL—and/or TLS certificates, open ports and web services running on these ports, associated with the given protected infrastructure element.

Sub-steps of step (240) caused to be executed by the first computing device 100 will described below with reference to FIG. 2B.

Step (240) begins at sub-step (241), wherein the first analysis module 108 of the external computing device 100 is configured to obtain the names of web services from the list of web services running on open ports of at least one computing device having a suspicious external IP address; and take a hash function from each one thereof. It should be noted that the hash function is taken according to the same algorithm that has been used to build the hash storage of malicious web services, for example, according to the SHA256 algorithm. Also, it should be noted that selection of an algorithm, such as the SHA256 algorithm, is not a limiting factor, this algorithm is named as an example; alternatively, any other algorithm could be used.

For example, resulting from sub-step (241), the first analysis module 108 can be configured to obtain four predetermined web service names from the above list (1), and further generate the following hashes:

- d1452346b1f850c336f4552f810d48ddf065618a600783455444a5cc43cf9f35
- a78eb06000bec36b79a127b77c640e1a9664502ea201f1bb0ceaf5f94b1432aa (2)
- a83a7ef76cbe8a3a6cfac2a2fdb0b9c9acd6ed0fcee7292ce59319474d31d500
- e488e34ba7c1bd7f68be636ab13e4adc12d4030096fc4bd9d8e24a820d93bbb1.

This completes sub-step (241), and step 240 proceeds to sub-step (242), where the first analysis module (108) is configured to search for each of the hashes obtained at sub-step (241), for example, the hashes from the list (2) in the hash storage of malicious web services, in the database of the first data storage module (104). Sub-step 242 is repeated until the end of the list, for example, the list (2).

Accordingly, if the list end is reached, and no hash from the list has been found in the hash storage of malicious web services, step 240 proceeds to sub-step (243).

Further, in response to detection of at least one of the obtained hashes in the hash storage of malicious web services at sub-step (242), the first analysis module 108 can be configured to add the list of detected malicious web services. It should be noted that in this example, searching for a hash from the list (2) coincides with the hash stored in the hash storage of malicious web services, since the third hash from the list (2) corresponds to Radmin Server web service, the use of which by an external computing device may be indicative of compromise of the network infrastructure 150.

Thus, the list of malicious web services detected during step (240) is added by the first analysis module (108). This list is stored in the database of the first data storage module (104).

In alternative non-limiting embodiments of the present technology, in case of detection of at least one malicious web service, execution of step (240) is interrupted and the described method proceeds to step (280), where the first analysis module 108 can be configured to determine the computing device located at the at least one suspicious IP address as being a malicious one; and the first notification module (110) is further caused to generate at least one report on detection of malicious activity in the network infrastructure (150) and sending it via the first communication module (102), for example, to an operator of the network infrastructure 150.

If searching for all hashes in the hash storage of malicious web services has produced no results, then after reaching the end of the list, for example, the list (2), sub-step (242) ends, and step 240 proceeds to sub-step (243).

At sub-step (243), the first analysis module (108) of the external computing device 100 can be configured to identify the at least one suspicious external (global) IP address, such as the suspicious IP address 111.222.333.444 (310 in FIG. 3A) obtained at step (240), in the Internet graph model 300.

Then step 240 proceeds to sub-step (244), where the first analysis module 108 is configured to identify a graph model fragment comprising all the elements associated with the IP address (310). In some non-limiting embodiments of the present technology, for this purpose, all the graph model elements, which the IP address (310) has any link with, are taken. In other non-limiting embodiments of the present technology, those elements are taken that are connected to the original element of the network infrastructure 150 with such a number of edges that does not exceed a preset threshold, for example, elements connected to the original element of the network infrastructure 150 with no more than 500 edges (links). The identified fragment of the Internet graph model 300 may look, for example, as shown in FIG. 3A.

Step 240 then proceeds to sub-step (245), where the first analysis module 108 is configured to apply at least one clearing algorithm to the identified graph model fragment. More specifically, in some non-limiting embodiments of the present technology, the at least one clearing algorithm can be configured to cut off the graph edges (links) which weight is less than a preset threshold.

Figure 3B:
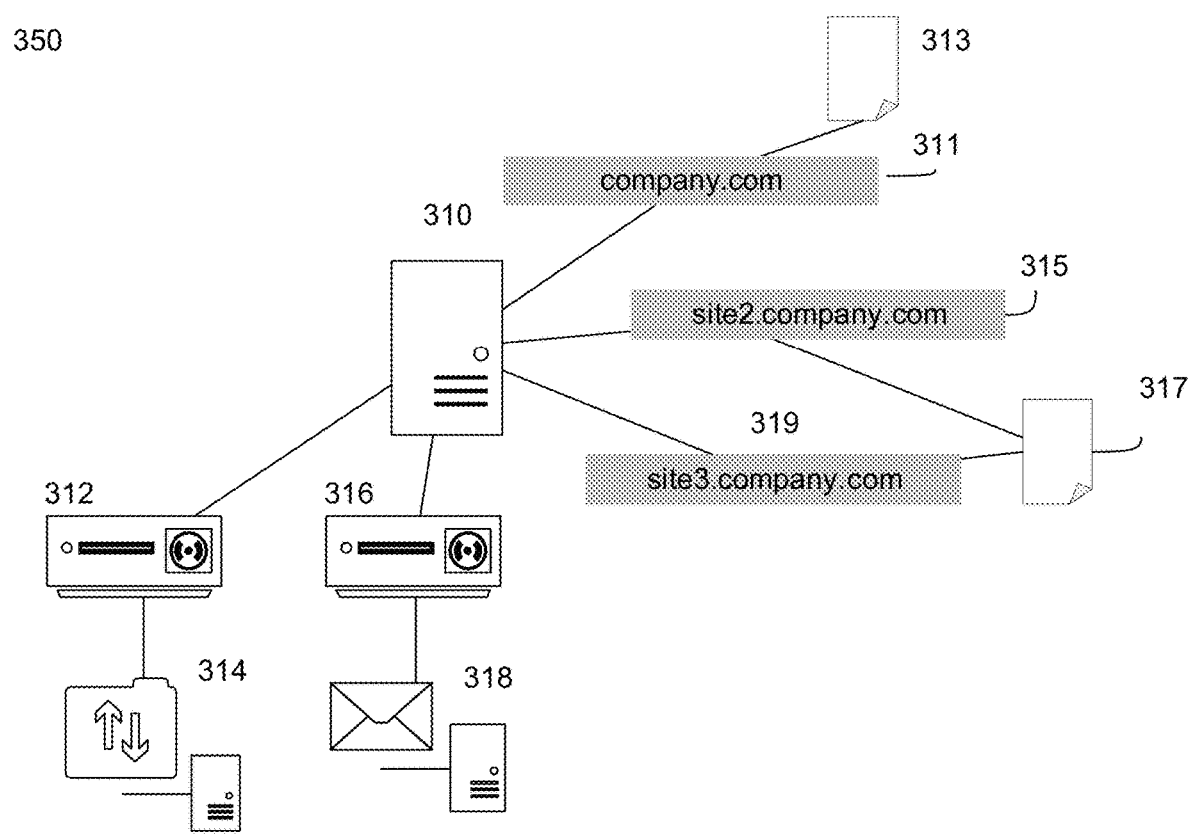
FIG. 3B depicts an example of a filtered fragment of the of the Internet graph model of FIG. 3A, in accordance with certain non-limiting embodiments of the present technology.

As a result of applying the at least one clearing algorithm at sub-step (245), the first analysis module 108 can be configured to obtain a cleared graph fragment. Example of such a cleared fragment (350) is shown in FIG. 3B. As it can be appreciated from FIGS. 3A and 3B, as a result of execution of sub-steps (243)-(245), three domains (311), (315) and (319), and two TLS certificates (313) and (317) have been identified in this example.

This completes sub-step (245), and step 240 proceeds to sub-step (246), where the first analysis module 108 can be configured to take a hash function for each of the identified elements of the network infrastructure 150 or parameters thereof, that is, for each identified vertex of the cleared graph fragment, according to the same algorithm that has been used to build the hash storage of malicious web services, for example, according to the SHA256 algorithm.

For example, for the above-mentioned vertices of the graph model fragment shown in FIG. 3B, i.e., for three domains, (311), (315) and (319) and two TLS certificates (313) and (317), resulting from sub-step (246), the first analysis module can be configured to obtain the following five hashes:

- e19e8f3840a5568afe531044b48e0485cb2c61e3e4a2e122d7ac8ec236da3f3, (3)
- f1a1b4d398dc0bd98d7caac890c52ae3be52c9028f700a62b582e85a3049f242,
- 0f0599c43dd7d37568c6f41c8016bc232c5033d7ddaf5f83fca26d9dd375e520,
- d53e96f24b3b30832a370df4f01cbcc36eeb68e7f07475073b932ed9f5706eda
- 21488535997ef4bbb6ef1ea3b34e4d7443cff161b42a6ddaea2a4b56644beb1c.

This completes sub-step (246), and step 240 proceeds to sub-step (247), where the first analysis module (108) is configured to search for each of the hashes obtained at sub-step (246), for example, the hashes from the list (3) in the hash storage of malicious web services, in the database of the first data storage module (104).

Similar to sub-step (242), at sub-step (247), in response to detection of at least one of the obtained hashes in the hash storage of malicious web services, the first analysis module 108 can be configured to add them in the list of the detected malicious web services. In the above example, searching for the fourth hash from the list (3) coincides with the hash stored in the hash storage of malicious web services, since this hash is the hash of the serial number of the TLS certificate for the CobaltStrike penetration testing framework, the use of which by an external computing device may be indicative of compromise of the network infrastructure 150.

Thus, first analysis module (108) is configured to add the list of malicious web services detected during step (240). This list is further stored in the database of the first data storage module (104).

In alternative non-limiting embodiments of the present technology, where the first analysis module is configured to detect at step (247) the at least one malicious web service, execution of step (240) is interrupted and the described method proceeds to step (280), where the first analysis module 108 can be configured to determine the computing device located on at least one suspicious IP address as being malicious; and the first notification module 110 can be configured to generate at least one report on detection of malicious activity in the network infrastructure (150) and further send this report via the first communication module (102) to the operator of the network infrastructure (150), as an example.

When the end of the list (3) is reached, sub-step (247), and thus step (240) ends, and the method proceeds to step (250).

Step 250: Determining, by the Second Analysis Module of the Second Computing Device, Whether there is a Match Between at Least One Service from the List of Services and a Respective One of the Known Malicious Services At step (250), according to certain non-limiting embodiments of the present technology, the first analysis module (108) can be configured to verify whether at least one service associated with the at least one malicious IP address coincides with the data on known malicious web services. This is done by checking the list of malicious web services detected at step (240).

If this list contains at least one entry, that is, during step (240) at least one malicious web service associated with at least one suspicious IP address obtained at step (240) has been detected, the method 200 proceeds to step (280), where first analysis module 108 of the external computing device 100 is caused, by the internal computing device 120, to (i) determine the computing device located on at least one suspicious IP address as being malicious, and (ii) generate at least one report on detection of malicious activity in the network infrastructure (150). Further, the first analysis module 108 can be configured to send the at least one report via the first communication module (102) to the operator of the network infrastructure (150).

By contrast, if the list of malicious web services detected at step (240) is empty, that is, no malicious web services have been detected during step (240), step (250) ends, and the method proceeds to step (260).

Step 260: Determining, by the Second Analysis Module of the Second Computing Device, an Interval of Ownership of the at Least One Suspicious IP Address At step (260), the first analysis module (108) can be configured to determine an interval of ownership of the at least one suspicious IP address, obtained at step (240). To that end, the first analysis module 108 can be configured to analyze historical data on the activity of various IP addresses, which data are previously obtained and stored in the database of the first data storage module (104) of the external computing device (100).

According to certain non-limiting embodiments of the present technology, historical data on the activity of various IP addresses is information about when (from what date to what date) on each specific IP address certain ports were opened, certain web services were running, when certain domains referred to each specific IP address. This information could be stored in the database in any known format enabling efficient search by a given parameter, for example, by an IP address.

In some non-limiting embodiments of the present technology, the historical data could be obtained from the Internet graph model 300, described above. In other non-limiting embodiments of the present technology, the historical data could be obtained independently, during periodical crawling the communication network 130, resulting from such crawling, ordering and storing information about what services on what ports of what device with a specific IP address are functioning as of a given date.

Figure 4:
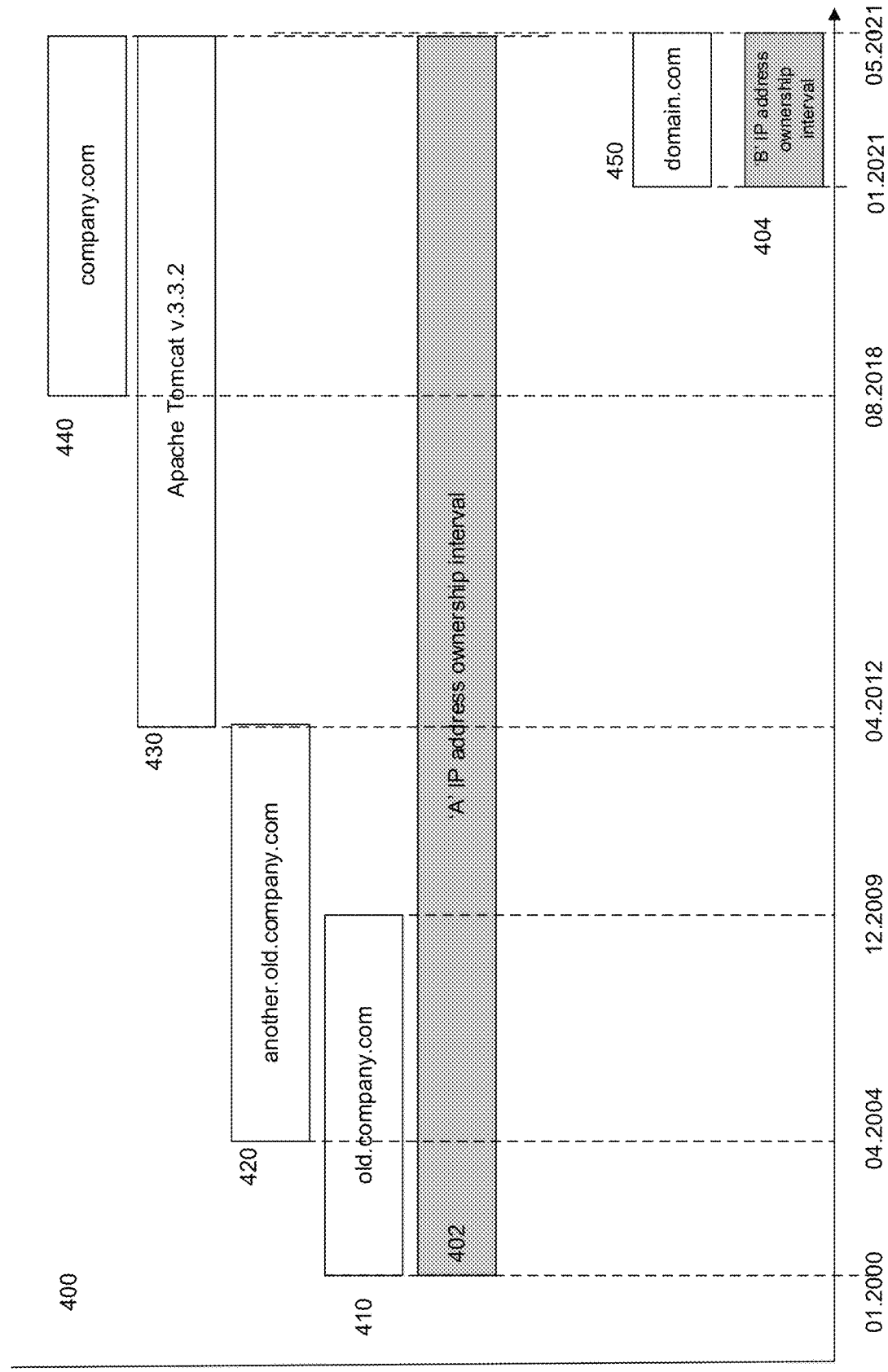
FIG. 4 depicts a time diagram for determining an interval of ownership of suspicious IP addresses, in accordance with certain non-limiting embodiments of the present technology.

With reference to FIG. 4, there is depicted a time diagram used for determining the ownership interval of the at least one suspicious IP address, in accordance with certain non-limiting embodiments of the present technology.

Thus, as it can be appreciate from FIG. 4, the first analysis module 108 can be configured to determine the ownership interval of the IP address A (402) as the sum of those time intervals when any domains, such as domain (410) old.company.com, domain (420) another.old.company.com, domain (440) company.com, referred to this IP address, or any web services, such as web service (430) Apache Tomcat v 0.3.3.2, were running on the ports of the device with the given IP address, or the device with the given IP address simply had at least one open port (not shown in FIG. 4).

Duration of time intervals is summed up, provided that every two adjacent intervals are overlapped at least for one day. As, for example, the interval of functioning the domain (420) another.old.company.com and the interval of functioning the web service (430) Apache Tomcat v.3.3.2 intersect.

In other non-limiting embodiments of the present technology, the duration of time intervals could be summed up also in case, if some two adjacent intervals are not overlapped on condition that the period, during which there have been no open ports on the device with the given IP address and no domain has referred to it, does not exceed a predetermined value, for example, one week or one month.

In this example, the first analysis module 108 can be configured to determine the ownership interval of the IP address 111.222.333.444, shown in FIG. 4, such as the ownership interval (402), as being approximately 7800 days, which corresponds to the period from January, 2000 to May, 2021.

At the same time, the ownership interval (404) of the other IP address, shown in FIG. 4, will be determined as being approximately 120 days, which corresponds to the period from January, 2021 to May, 2021.

It should be noted that "approximately" in this case means that taking a decision, which is described below in respect to step (270), does not require to compute the ownership interval within the accuracy of one day. The said computation could be performed either with a predetermined accuracy, say, within the accuracy of 10 days, or imply rounding of the computed value according to common arithmetic rules.

After determining the ownership interval of at least one suspicious IP address by the first analysis module (108), step (260) ends, and the method 200 proceeds to step (270).

Step 270: Determining Whether the Interval of Ownership Exceeds a Threshold Value At step (270), according to non-limiting embodiments of the present technology, the internal computing device 120 can be configured to cause the external computing device 100 to determine whether the value of the ownership interval of the at least one suspicious IP address, determined at step 260, exceeds a threshold value.

This threshold value could be selected experimentally at the stage of preparing the system implementing the method 200, or it could be selected automatically depending on various parameters, for example, depending on the properties of the network infrastructure (150), such as the total number of the computing devices or any other parameters. In this example, the threshold value could be pre-determined as equal to 200 days, for example.

If the value of the determined ownership interval of the at least one suspicious IP address exceeds the threshold value, the first analysis module 108 can be configured to determine an indication of the fact that the at least one computing device having this at least one suspicious IP address functions on the communication network 150 long enough. In such a case, the first analysis module 108 can be configured to determine this computing device as being legitimate.

For example, if, at step (270), the first analysis module (108) determines that the determine ownership interval (402) of the IP address 111.222.333.444 (7800 days) exceeds the threshold value (200 days), the first analysis module 108 can be configured to determine the computing device with the specified IP address as being legitimate.

By contrast, if, at step (270), the first computing device 108 has determined that the computed ownership interval (404) by some other IP address B (120 days) does not exceed the preset threshold value (200 days), the method 200 proceeds to step (280), where first computing device 108 can be configured to (i) determine the computing device located on this IP address as being malicious; and (ii) the first notification module (110) can be configured to generate at least one report on detection of malicious activity in the network infrastructure (150) for transmission thereof via the first communication module (102), for example, to the orator of the network infrastructure 150.

As described above in reference to FIG. 1, the first notification module 110 enables to generate and send (via the first communication module 102) notifications about potential compromise of the protected network infrastructure by at least one of the following methods: by e-mail, by sending SMS, by sending MMS, by sending a push notification, by a message in an instant messenger by generating an API event.

It should be noted that use of such a notification tool as API events enables to implement additional integration of the described system with various third-party tools, such as firewalls, security management platforms, SIEM solutions, and so on. Actually, the generation of all the listed notifications, such as emails, SMS, MMS, push notifications, etc. is not specific and could be performed by any well-known method.

It should be noted that the second scanning module (126) of the internal computing device (120) could also be configured to determine that at least one suspicious device scanned at the above step (230) is inaccessible for scanning. That is, detecting a situation when, in response to scanning at least one suspicious external (global) IP address, it is not possible to get a list of ports open on this IP address.

The method 200 hence terminates. It should be noted that although the method 200 as described above is executed by the internal computing device 120 causing the external computing device 100 to execute certain steps, such as steps 240 to 280; in other non-limiting embodiments of the present technology, on the contrary, the method 200 can be executed by the external computing device 100 causing the internal computing device 120 to execute the steps 240 to 280.

It should also be noted that the external computing device (100) and the internal computing device (120) could be configured to implement an alternative method for active detection of malicious network resources.

Figure 2C:
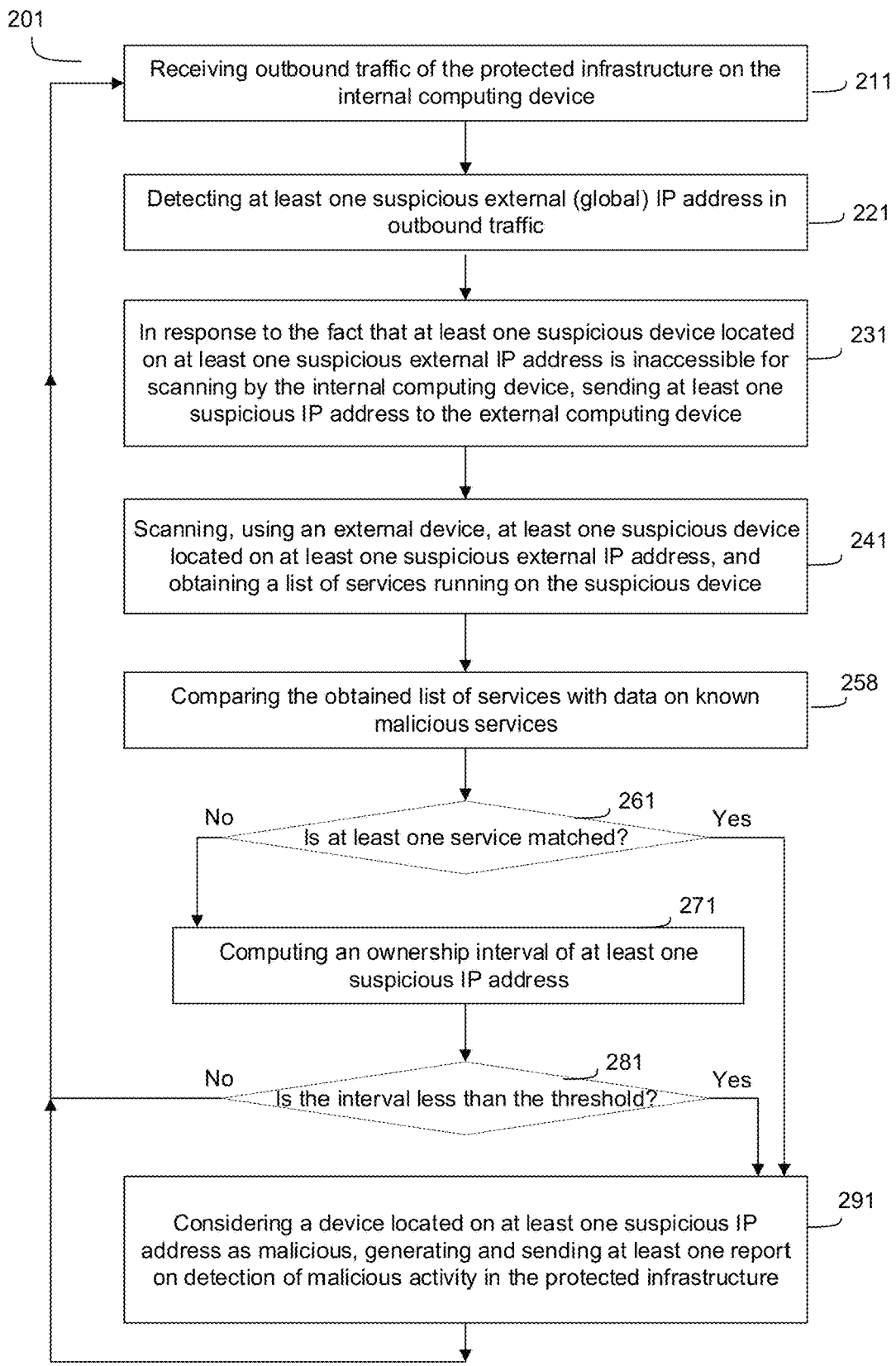
FIG. 2C depicts flowchart of an other method for detecting malicious network resources in the network infrastructure of FIG. 1, in accordance with certain non-limiting embodiments of the present technology.

With reference to FIG. 2C, there is depicted a flowchart diagram of a second method 201 for detecting malicious network resources on the network infrastructure 150, in accordance with certain non-limiting embodiments of the present technology. Similar to the method 200, the second method 201 can be executed by the internal computing device 120.

The method (201) begins at step (211) where, similar to step 210 of the method 200, the outbound traffic of the network infrastructure (150) is received by the second communication module (122) of the internal computing device (120).

All outbound traffic received by the second communication module (122) is transmitted unchanged to the second analysis module (128) for analysis. In this case, the method (201) proceeds to step (221), where the second analysis module 128 of the internal computing device 120 is configured to detect the at least one suspicious external IP address in the outbound traffic. This is also done in a similar way to step (220) described above.

In response to the second scanning module (126) of the internal computing device 120 being unable to scan at least one suspicious external (global) IP address in accordance with the way described for step (230), the second analysis module 128 can be configured to determine that the at least one device on the at least one suspicious external (global) IP address, for example, a malefactor's computing device (190), is inaccessible for scanning, and at step (231), the second communication module (122) of the internal computing device (120) can be configured to transmit the data indicative of the at least one suspicious external (global) IP-address to the external computing device (100) for further analysis.

This completes step (231), and the second method 201 proceeds to step (241).

At step (241), similarly to step 230 described above, the first scanning module (106) of the external computing device (100) can be caused to (1) scan the at least one suspicious device located on the at least one suspicious IP address, for example, IP address 111.222.333.444, (2) obtain the list of ports open on this IP address, and also the list of web services running on these ports and software versions corresponding to these web services.

When the first scanning module (106) of the external computing device (100) receives the list of ports open on the given IP address, and also the list of web services running on these ports and software versions corresponding to these web services, the listed information is stored in the database of the first data storage module (104) of the first computing device (100).

Then, step (241) ends, and the second method 201 proceeds to step (258), which is executed similarly to step (240) described above with reference to FIG. 2B.

Upon completion of step (258), the second method 201 proceeds to steps (261), (271), (281) and (291), which are executed in a similar way as described above for steps (250), (260), (270) and (280).

Computing Environment

Figure 5:
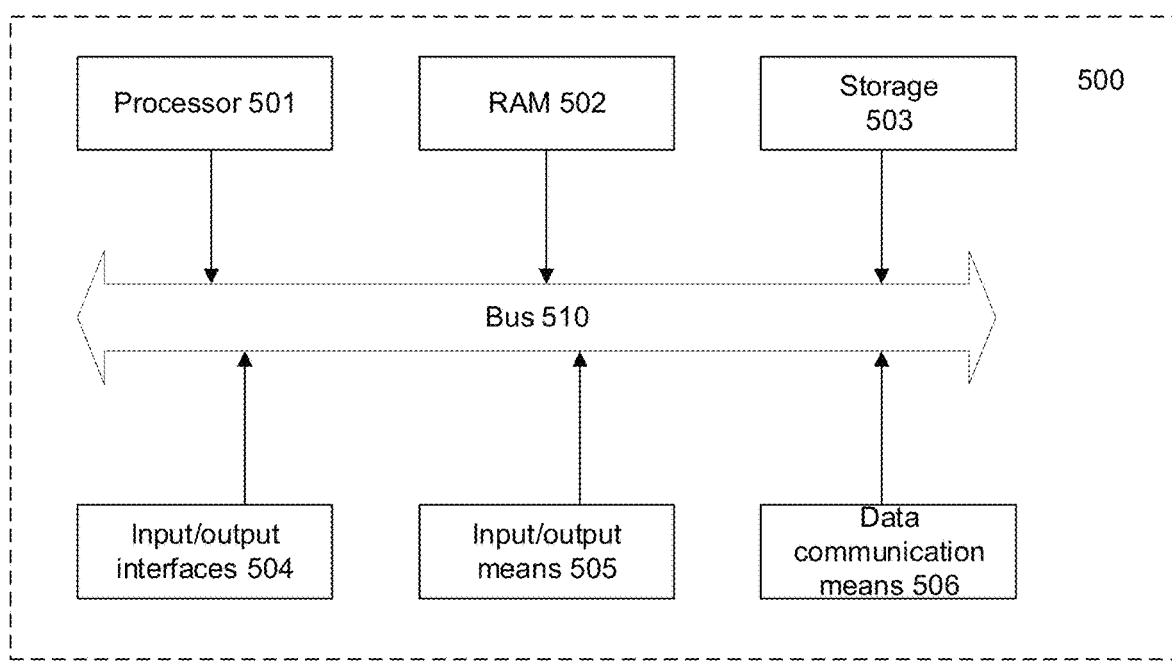
FIG. 5 depicts a schematic diagram of an example computing environment configurable for execution of the present methods of FIG. 2, in accordance with certain non-limiting embodiments of the present technology.

With reference to FIG. 5, there is depicted an example functional diagram of the computing environment 500 configurable to implement certain non-limiting embodiments of the present technology including the method 200 and the second method 201 described above.

In some non-limiting embodiments of the present technology, the computing environment 500 may include: the processor 501 comprising one or more central processing units (CPUs), at least one non-transitory computer-readable memory 502 (RAM), a storage 503, input/output interfaces 504, input/output means 505, data communication means 506.

According to some non-limiting embodiments of the present technology, the processor 501 may be configured to execute specific program instructions the computations as required for the computing environment 500 to function properly or to ensure the functioning of one or more of its components. The processor 501 may further be configured to execute specific machine-readable instructions stored in the at least one non-transitory computer-readable memory 502, for example, those causing the computing environment 500 to execute the method 200 and the second method 201.

In some non-limiting embodiments of the present technology, the machine-readable instructions representative of software components of disclosed systems may be implemented using any programming language or scripts, such as C, C++, C#, Java, JavaScript, VBScript, Macromedia Cold Fusion, COBOL, Microsoft Active Server Pages, Assembly, Perl, PHP, AWK, Python, Visual Basic, SQL Stored Procedures, PL/SQL, any UNIX shell scrips or XML. Various algorithms are implemented with any combination of the data structures, objects, processes, procedures and other software elements.

The at least one non-transitory computer-readable memory 502 may be implemented as RAM and contains the necessary program logic to provide the requisite functionality.

The storage 503 may be implemented as at least one of an HDD drive, an SSD drive, a RAID array, a network storage, a flash memory, an optical drive (such as CD, DVD, MD, Blu-ray), etc. The storage 503 may be configured for long-term storage of various data, e.g., the aforementioned documents with user data sets, databases with the time intervals measured for each user, user IDs, etc.

The input/output interfaces 504 may comprise various interfaces, such as at least one of USB, RS232, RJ45, LPT, COM, HDMI, PS/2, Lightning, FireWire, etc.

The input/output means 505 may include at least one of a keyboard, joystick, (touchscreen) display, projector, touchpad, mouse, trackball, stylus, speakers, microphone, and the like. A communication link between each one of the input/output means 505 can be wired (for example, connecting the keyboard via a PS/2 or USB port on the chassis of the desktop PC) or wireless (for example, via a wireless link, e.g., radio link, to the base station which is directly connected to the PC, e.g., to a USB port).

The data communication means 506 may be selected based on a particular implementation of the network 120, and may comprise at least one of: an Ethernet card, a WLAN/Wi-Fi adapter, a Bluetooth adapter, a BLE adapter, an NFC adapter, an IrDa, a RFID adapter, a GSM modem, and the like. As such, the connectivity hardware 404 may be configured for wired and wireless data transmission, via one of WAN, PAN, LAN, Intranet, Internet, WLAN, WMAN, or GSM networks.

These and other components of the computing environment 500 may be linked together using a common data bus 510.

It should be expressly understood that not all technical effects mentioned herein need to be enjoyed in each and every embodiment of the present technology.

Modifications and improvements to the above-described implementations of the present technology may become apparent to those skilled in the art. The foregoing description is intended to be exemplary rather than limiting. The scope of the present technology is therefore intended to be limited solely by the scope of the appended claims.

The invention claimed is:

1. A computer-implementable method for detection of malicious network resources, the method being executable by a first computing device of a distributed computer system, the first computing device being disposed inside of a perimeter of the distributed computer system, the first computing device being configured to communicatively connect to a second computing device of the distributed computer system, the second computing device being disposed outside of the perimeter of the distributed computer system, the method comprising:
- receiving, by a communication module of the first computing device, an outbound traffic of the distributed computer system,
- detecting, by a first analysis module of the first computing device, at least one suspicious external IP address in the outbound traffic,
- scanning, by a scanning module of the first computing device, at least one suspicious device located at the detected at least one suspicious IP address to obtain a list of services running on the at least one suspicious device,
- transmitting, by the communication module of the first computing device, the at least one suspicious IP address and the list of services to the second computing device, the transmitting being for triggering the second computing device to execute:
  - comparing, using a second analysis module of the second computing device, the list of services with a data on known malicious services, and
    - in response to a match between at least one service from the list of services and a respective one of the known malicious services:
      - determining, by the second analysis module of the second computing device, the at least one suspicious device, located at the at least one suspicious IP address as being a malicious one,
      - generating, by a notification module of the second computing device, at least one report on detection of malicious activity in the distributed computer system,
    - in response to an absence of the match between the at least one service from the list of services and the respective one of the known malicious services:
      - determining, by the second analysis module of the second computing device, an interval of ownership of the at least one suspicious IP address, and
      - in response to the interval of ownership being less than a threshold value, determining, by the second analysis module of the second computing device, the at least one suspicious device, located at the at least one suspicious IP address as being malicious one,
      - generating, by the notification module of the second computing device, the at least one report on detection of the malicious activity in the distributed computer system, and
      - in response to the interval of ownership exceeding the threshold value, determining, by the analysis module of the second computing device, the at least one suspicious device as being a legitimate one.

2. The method of claim 1, wherein in response to the scanning module of the first computing device being incapable of accessing the at least one suspicious device located at the at least one suspicious IP address, the method further comprises:
- transmitting, by the communication module of the first computing device, data about the at least one suspicious IP address to the second computing device, thereby triggering the second computing device to execute:

scanning, by a second scanning module of the second computing device, the at least one suspicious device located at the at least one suspicious IP address, and obtaining, by the second scanning module of the second computing device, the list of services running on the at least one suspicious device.

3. The method of claim 1, wherein the detecting, by the first analysis module of the first computing device, the at least one suspicious IP address in the outbound traffic comprises:

detecting at least one anomalous traffic fragment in the outbound traffic, extracting, from the at least one anomalous traffic fragment, at least one IP address of a computing device to which the at least one traffic fragment is addressed, and determining the extracted at least one IP address as being the at least one suspicious IP address.

4. The method of claim 3, wherein the detecting the at least one anomalous traffic fragment in the outbound traffic, comprises applying at least one of:

a deep neural network having been trained on a tagged traffic, a OneClassSVM classifier having been trained on legitimate traffic samples, machine learning models, including at least one of: a Random Forest Classifier, an XGBoost machine-learning model, a KNN machine-learning model, an AdaBoost machine-learning model, that have been trained on tagged samples of traffic, searching in the outbound traffic by pre-determined feature signatures, and using a sliding window approach to collect statistical features of traffic logs of the outbound traffic.

5. The method of claim 1, wherein the triggering the second computing device to execute the comparing the list of services with the data on the known malicious services comprises triggering the second computing device to use a network graph model of a communication network to which the distributed computer system is coupled.

6. The method of claim 1, wherein the triggering the second computing device to execute the determining the interval of ownership of the at least one suspicious IP address comprises triggering the second computing device to use historical data on activity of IP addresses of a communication network to which the distributed computer system is coupled.

7. The method of claim 1, wherein the transmitting is for further triggering the second computing device to transmit the at least one generated report on detection of the malicious activity in the distributed computer system to an operator thereof, the transmitting the at least one generated report comprising transmitting using at least one of:

an e-mail,
an SMS,
an MMS,
a push notification,
an instant messenger message, and
an API event.

8. A computing device of a distributed computer system for detection of malicious network resources, the computing device being disposed inside of a perimeter of the distributed computer system, the computing device comprising:

a processor and a non-transitory computer-readable medium storing instructions, the processor, upon executing the instructions, being configured to execute:

receiving, by a communication module of the computing device, an outbound traffic of the distributed computer system, detecting, by an analysis module of the computing device, at least one suspicious external IP address in the outbound traffic, scanning, by a scanning module of the computing device, at least one suspicious device located at the detected at least one suspicious IP address to obtain a list of services running on the at least one suspicious device, and transmitting, by the communication module of the computing device, the at least one suspicious IP address and the list of services to an other computing device of the distributed computer system, which is disposed outside the perimeter of the distributed computer system, the transmitting being for triggering the other computing device to execute:

receiving, from the computing device, the at least one suspicious IP address and the list of services running on the at least one suspicious device;

comparing the list of services with a data on known malicious services, and in response to a match between at least one service from the list of services and a respective one of the known malicious services:

determining the at least one suspicious device, located at the at least one suspicious IP address as being a malicious one, generating at least one report on detection of malicious activity in the distributed computer system, in response to an absence of the match between the at least one service from the list of services and the respective one of the known malicious services:

determining an interval of ownership of the at least one suspicious IP address, and in response to the interval of ownership being less than a threshold value, determining the at least one suspicious device, located at the at least one suspicious IP address as being malicious one, and generating the at least one report on detection of the malicious activity in the distributed computer system, and in response to the interval of ownership exceeding the threshold value, determining the at least one suspicious device as being a legitimate one.

* * * * *